(12) United States Patent  
McGoveran

(10) Patent No.: US 7,103,597 B2
(45) Date of Patent: Sep. 5, 2006

(54) ADAPTIVE TRANSACTION MANAGER FOR COMPLEX TRANSACTIONS AND BUSINESS PROCESS

(76) Inventor: David O. McGoveran, 15905 Bear Creek Rd., Boulder Cr., CA (US) 95006

( * ) Notice: Subject to any disclaimer, the term of this patent is extended or adjusted under 35 U.S.C. 154(b) by 414 days.

(21) Appl. No.: 10/263,589

(22) Filed: Oct. 3, 2002

(65) Prior Publication Data

US 2004/0068501 A1  Apr. 8, 2004

(51) Int. Cl.
*G06F 7/00* (2006.01)
*G06F 17/30* (2006.01)
*G06F 12/00* (2006.01)

(52) U.S. Cl. .......................................... 707/8; 707/202
(58) Field of Classification Search ................ 707/10, 707/101, 201, 202, 103 R, 8; 714/1–57
See application file for complete search history.

(56) References Cited

U.S. PATENT DOCUMENTS

| | | | | |
|---|---|---|---|---|
| 4,498,145 A * | 2/1985 | Baker et al. | ................ | 707/202 |
| 5,594,889 A * | 1/1997 | Colgate et al. | ............. | 711/171 |
| 5,664,088 A * | 9/1997 | Romanovsky et al. | ........ | 714/13 |
| 5,734,897 A * | 3/1998 | Banks | ........................ | 707/202 |
| 5,966,706 A * | 10/1999 | Biliris et al. | .................. | 707/10 |
| 6,009,405 A * | 12/1999 | Leymann et al. | ............. | 705/9 |
| 6,014,673 A * | 1/2000 | Davis et al. | ................ | 707/202 |
| 6,154,847 A * | 11/2000 | Schofield et al. | ............. | 714/4 |
| 6,192,365 B1 * | 2/2001 | Draper et al. | ............... | 707/101 |
| 6,233,585 B1 * | 5/2001 | Gupta et al. | ........... | 707/103 R |
| 6,289,356 B1 * | 9/2001 | Hitz et al. | .................. | 707/201 |
| 2002/0099756 A1 * | 7/2002 | Catthoor et al. | ........... | 709/102 |

* cited by examiner

*Primary Examiner*—Don Wong
*Assistant Examiner*—Cheryl M Shechtman
(74) *Attorney, Agent, or Firm*—George S. Cole

(57) ABSTRACT

This is a method for managing and optimizing transaction processing that: (1) significantly expands the robustness of systems with respect to consistency, reliability, and recoverability; (2) provides multiple performance improvements over traditional methods; (3) enables transactions in a distributed business process to recover from errors without the cost of two-phase commit; (4) enables enhancements to resource management; and, (5) provides improved scheduling. The method further enables a high degree of collaborative and adaptive transaction management over traditional transaction managers.

89 Claims, 5 Drawing Sheets

ADAPTIVE TRANSACTION MANAGER FOR COMPLEX TRANSACTIONS AND BUSINESS PROCESS

BACKGROUND OF THE INVENTION

A transaction can be defined as a set of actions on a set of resources or some subset thereof, said actions including changes to those resources. The initial state of a set of resources that will be changed by a transaction is defined as being consistent, and so either implicitly or explicitly satisfy a set of consistency conditions (a.k.a. constraints or integrity rules). Each particular transaction includes one or more operations that may alter the resources (e.g. addition, subtraction, selection, exchange, or transformation). Once defined, the transaction creates a delimitible set of changes from initial conditions. Each change to the resources (short of the final change) creates an intermediate state of those resources, which often are not intended to be accessible to other transactions.

Under such an implementation, each transaction operates on the set of resources in an initial state and, after any operations performed by the transaction, leaves the set of resources in a final state. Thus a transaction may be viewed as a means of transforming a set of resources from an initial consistent state to a final consistent state (possibly, but generally not the same as the initial).

Transaction processing is subject to multiple difficulties. A transaction may use resources inefficiently. Transactions may fail to complete operations as designed. Errors may cause the final state to be inconsistent. Transactions may execute too slowly. Such difficulties can be handled manually if the environment is simple enough. Automated or semi-automated means (as supplied, for example, by a transaction management facility) are required in more sophisticated situations.

An environment in which transactions operate is often subject to a transaction management facility, often referred to simply as a "transaction manager." The responsibility of a transaction manager is to ensure the initial and final states are consistent and that no harmful side effects occur in the event that concurrent transactions share resources (isolation). A transaction manager typically enforces the isolation of a specific transaction using a default concurrency control mechanism (e.g., pessimistic or optimistic). If a condition such as an error occurs before the final state is reached, it is often the responsibility of a transaction management facility to return the system to the initial state. This sort of automated transaction processing lies behind the greatest volume of financial and commercial transactions extant in modern society.

Automated transaction processing, both with and without transaction management facilities, has been designed traditionally with an unspoken assumption that errors are exceptional. The programming, both its design and coding, focuses on implementing transactions in a near-perfect world where it is permissible to simply start over and redo the work if anything goes wrong. Even if this were to model accurately the majority of automated commercial transactions, it would not reflect the entirety of any business's real world experience. In the real world, eighty percent or more of the management effort and expertise is about handling exceptions, mistakes, and imperfections. In automated transaction processing, error recovery mechanisms are usually seen as an afterthought, a final 'check-box' on the list of features and transactions that can be handled (if all goes perfectly).

A naïve approach to the implementation of complex automated transaction processing systems maintains that the system resulting from integrating (via transactional messaging) a set of applications that already have error recovery mechanisms will itself recover from errors. Experience and careful analysis have shown that nothing could be further from the truth. As more and more business functions are integrated, the problems of automated error recovery become increasingly important and complex. Errors can propagate just as rapidly as correct results, but the consequences can be devastating.

As more and more business functions are integrated, the problems of automated error recovery and resource management become increasingly important. It's only natural that many of the systems that a business automates first are deemed by that business to enable the execution of its core competencies, whose completion is 'mission critical'. Automation demands the reliability we associate with transaction management if error recovery is to be robust. With each success at automating a particular business transaction, the value of connecting and integrating disparate automated transactions increases. Separate transactions, each of them simple, when connected become a complex transaction. With each integrative step, the need for acceptable error recovery becomes ever more important.

Traditional approaches to automated transaction management emphasize means to guarantee the fundamental properties of a properly defined or 'formal' transaction, which are atomicity, consistency, isolation, and durability. These properties are usually referred to by their acronym, ACID. Transactions, especially if complex, may share access to resources only under circumstances that do not violate these properties, although the degree to which transaction management facilities strictly enforce the isolation property is often at the discretion of the user.

It is not uncommon to refer to any group of operations on a set of resources (i.e., a unit of work) as a transaction, even if they do not completely preserve the ACID properties. In keeping with this practice, we will use the term transaction without a qualifying adjective or other modifier when referring a unit of work of any kind whether formal or not. We will use the qualified term pseudo-transaction when we want to refer specifically to a unit of work that does not preserve all of the ACID properties, although it may preserve some of them. Pseudo-transactions exist for a variety of reasons including the difficulty of proper transaction design and enforcement, incomplete knowledge of consistency rules, attempts to increase concurrency at the expense of decreased isolation, attempts to increase performance at the expense of atomicity, and so on.

The ACID properties lead to a very specific behavior when one or more of the elements that compose a transaction fail in a manner that cannot be transparently recovered (a so-called "unrecoverable error"): the atomicity property demands that the state of the resources involved be restored so that it is as though no changes whatsoever had been made by the transaction. Thus, an unrecoverable error always results in transitioning to the initial state (i.e., the initial state being restored), the typical process for achieving this being known as "rollback." An alternative method of restoring the initial state is to run an "undo" or "inverse" transformation known as a compensating transaction (discussed in more detail below). This of course presumes that for such mandated compensating transactions, for every error it is possible to first identify the class of error, then most suitable compensating transaction, and finally to implement that compensating transaction. A problem with the current approach to enforcing atomicity is that viable work is often wasted when the initial state is recovered. A second problem is that transactions dependent on a failed transaction cannot begin until the failed transaction is resubmitted and finally completes, thereby possibly resulting in excessive processing times and perhaps ultimately causing a failure to achieve the intended business purpose.

The consistency property guarantees the correctness of transactions by enforcing a set of consistency conditions on the final state of every transaction. Consistency conditions are usually computable, which means that a software test is often executed to determine whether or not a particular consistency condition is satisfied in the current state. Thus, a correctly written transaction becomes one which, when applied to resources in a first consistent state, transforms those resources into a second (possibly identical) consistent state. Intermediate states, created as the component operations of a transaction are applied to resources, may or may not satisfy a set of consistency conditions and so may or may not be a consistent state. A problem with this approach is that consistency must be either cumulative during the transaction, or else enforced at transaction completion. In most cases, transactions are assumed to be written correctly and the completion of a transaction is simply assumed to be sufficient to insure a consistent state. This leads to a further problem: the interactions among a collection of transactions that constitute a complex transaction may not result in a consistent state unless all consistency rules are enforced automatically at transaction completion.

For complex transactions that share resources, the isolation property further demands that concurrent or dependent transactions behave as though they were run in isolation (or were independent): that is, no other transaction can have seen any intermediate changes (there are no "side effects") because these might be inconsistent. The usual approach to ensuring the isolation property is to lock any resource that is touched by the transaction, thereby ensuring that other transactions cannot modify any such resource (a share lock) and cannot access modified resources (an exclusive lock). With regard to resource management, locking is used to implement a form of dynamic scheduling. The most commonly used means for ensuring this is implementing the rule known as "two-phase locking" wherein while a transaction is processing, locks on resources accessed by that transaction are acquired during phase one and are released only during phase two, with no overlap in these phases. Such an implementation guarantees that concurrent or dependent transactions can be interleaved while preserving the isolation property. A problem with this approach is that it necessarily increases the processing time of concurrent transactions that need to access the same resources, since once a resource is locked, it may not be modified by any other transaction until the locking transaction has completed. Another problem due to this approach is that it occasionally creates a deadly embrace or deadlock condition among a group of transactions. In the simplest case of the group consisting of only two transactions, each of the two transactions wait indefinitely for a resource locked by the other. Deadlock conditions can arise in complex ways among groups of more than two transactions. Other approaches to maintaining the isolation property include optimistic concurrency (such as time stamping) and lock or conflict avoidance (such as static scheduling via transaction classes or conflict graphs, nested transactions, and multi-versioning). Various caching schemes have been designed to improve concurrency by minimizing the time required to access a resource, while respecting a particular approach to enforcing the isolation property. Each of the existing approaches to enforcing isolation, and the associated techniques and implications for resource management, fails to meet the needs imposed by complex, possibly distributed, business transactions.

If no error occurs, the completion of the transaction guarantees not only a consistent state, but also a durable one (the durability property) through a process known as "commit." The step in a transaction at which a "commit" is processed is known as the commit point. The durability property is intended to guarantee that the specific result of a completed transaction can be recovered at a later time, and cannot be repudiated. Ordinarily, the durability property is interpreted as meaning that the final state of resources accessed by a transaction is, in effect, recorded in non-volatile storage before confirming the successful completion of the transaction. Usually, this is done by recording some combination of resource states, along with the operations that have been applied to the resources in question. The software that handles this recording is called a resource manager.

A variant of the commit point, in which a user (possibly via program code) asserts to the transaction manager that they wish to make the then current state recoverable and may subsequently wish to rollback work to that known state, is known as a savepoint. Because savepoints are arbitrarily defined, they need not represent a consistent state. Furthermore, the system will return to a specific savepoint only at the explicit request of the user. Typically, savepoints are not durable. Savepoints cannot be asserted automatically by the system except in the most rudimentary fashion as, for example, after every operation or periodically based on elapsed time or quantity of resources used. None of these approaches enable the system to determine to which savepoint it should rollback.

When the elements of a transaction are executed (whether concurrent or sequential) under multiple, independent resource managers, the rollback and commit processes can be coordinated so that the collection behaves as though it were a single transaction. In essence, the elements are implemented as transactions in their own right, but are logically coupled to maintain ACID properties to the desired degree for the collection overall. Such transactions are called distributed transactions. The usual method for achieving this coordination is called two-phase commit. Unfortunately, this is an inefficient process which tends to reduce concurrency and performance, and cannot guarantee coordination under all failure conditions. Under certain circumstances, a system failure during two-phase commit can result in a state that is incorrect and that then requires difficult, costly, and time-consuming manual correction during which the system is likely to be unavailable. As with single transactions, compensating transactions can sometimes be used to restore the initial state of a collection of logically coupled transactions. In such cases, it may be necessary to run special compensating transactions that apply to the entire collection of transactions (known as a compensation sphere whether or not the collection is a distributed transaction).

There are numerous optimizations and variations on these techniques, including split transactions, nested transactions, and the like. In practice, all these approaches have several disadvantages (and differ from the present invention):

poor concurrency due to locking is common;

the cost of rollback, followed by redoing the transaction, can be excessive;

the conditions of consistency, isolation, and durability are tightly bound together;

logically dependent transactions must either (a) be run sequentially with the possibility that an intervening transaction will alter the final state of the first transaction before the second transaction can take over, or (b) be run together as a distributed transaction, thereby locking resources for a much longer time and introducing two-phase commit performance and concurrency penalties;

there is significant overhead in memory and processing costs on already complex transactions;

the errors which are encountered and identified are not recorded (which can complicate systematic improvement of a system);

it is often undesirable in a business scenario to return a set of resources to some prior state, especially when a partially ordered set of interdependent transactions (i.e., a business process) has been run;

it is not always possible to define a compensating transaction for a given transaction, and the best compensating transaction often depends on context;

business transactions may result in very long times from start to completion, and may involve many logically coupled transactions, possibly each running under separate transaction or resource managers; and, finally, the transaction manager will not be able to compensate for or recover from certain context-dependent, external actions that affect resources external to the resource manager.

Transactions can be classified broadly into three types, with corresponding qualifiers or adjectives: physical, logical, and business. A physical transaction is a unit of recovery; that is, a group of related operations on a set of resources that can be recovered to an initial state as a unit. The beginning (and end) of a physical transaction is thus a point of recovery. A physical transaction should have the atomicity and durability properties. A logical transaction is a unit of consistency; that is, a group of related operations on a set of resources that together meet a set of consistency conditions and consisting of one or more coordinated physical transactions. The beginning (and end) of a logical transaction is a point of consistency. In principle, logical transactions should have the ACID properties. A business transaction is a unit of audit; that is, a group of related operations on a set of resources that together result in an auditable change and consisting of one or more coordinated transactions. If, as is the ideal construction, each of these component transactions are logical transactions, business transactions combine to form a predictable, well-behaved system. The beginning and end of a business transaction are thus audit points, by which we mean that an auditor can verify the transaction's identity and execution. Audit information obtained might include identifying the operations performed, in what order (to the degree it matters), by whom, when, with what resources, that precisely which possible decision alternatives were taken in compliance with which rules, and that the audit system was not circumvented. Business transactions can be composed of other business transactions. Time spans of a business transaction can be as short as microseconds or span decades (e.g., life insurance premium payments and eventual disbursement which must meet the consistency conditions imposed by law and policy).

The efficiency, correctness, and auditability of automated business transactions have a tremendous influence on a business' profitability. As transaction complexity increases, the impact of inefficiencies and errors increases combinatorially.

There are at least four general classes of ways that transactions can be complex. First, a transaction may involve a great deal of detail in its definition, each step of which may be either complex or simple, and may inherently require considerable time to process. Even if each individual step or operation is simple, the totality of the transaction may exceed the average human capacity to understand it in detail—for example, adding the total sum of money paid to a business on a given day, when the number of inputs are in the millions. This sort of complexity is inherently addressed (to the degree possible) by automation, and by following the well-known principles of good transaction design.

Second, a transaction may be distributed amongst multiple, separate environments, each such environment handling a sub-set of the total transaction. The set of resources may be divisible or necessarily shared, just as the processing may be either sequential or concurrent, and may be dependent or independent. Distributed transactions inherently impose complexity in maintaining the ACID properties and on error recovery.

Third, a transaction may be comprised of multiple, linked transactions—for example, adding all of the monies paid in together, adding all of the monies paid out together, and summing the two, to establish a daily net cashflow balance for a company. Such joined transactions may include as a sub-transaction any of the three complex transactions (including other joined transactions, in recursive iteration). And, of course, linked transactions may then be further joined, theoretically ad infinitum. Each sub transaction is addressed as its own transaction, and thus is handled using the same means and definitiveness. Linked transactions can become extremely complex due to the many ways they can be interdependent, thus making their design, maintenance, and error management costly and their use risky. Tremendous care must be taken to keep complexity under control.

Fourth, and last, a transaction may run concurrently in a mix of transactions (physical, logical, business, and pseudo). As the number of concurrent transactions, the number of inter-dependencies, or the speed of processing increase, or as the available resources decrease, the behavior of the transaction becomes more complex. Transaction managers, careful transaction design, and workload scheduling to avoid concurrency are among the methods that are used to manage this type of complexity, and provide only limited relief. Part of the problem is that the group behavior of the mix becomes increasingly unpredictable, and therefore unmanageable, with increasing complexity.

A business process may be understood as consisting of a set of partially-ordered inter-dependent or linked transactions (physical, logical, business, and pseudo), sometimes relatively simple and sometimes enormously complex, itself implementing a business transaction. The flow of a business process may branch or merge, can involve concurrent activities or transactions, and can involve either synchronous or asynchronous flows. Automated business process management is rapidly becoming the principal means of enabling business integration and business-to-business exchanges (e.g., supply chains and trading hubs).

Knowledge of both the internal logical structure of transactions and the interrelationships among a group of transactions is often represented in terms of an interconnected set of dependencies. Two types of dependency are important here: semantic and resource. If completion of an operation (or transaction) A is a necessary condition for the correct completion of some operation (or transaction) B, B is said to have semantic dependency on A. If completion of an operation (or transaction) T requires some resource R, transaction T is said to have a resource dependency on the resource R. Resource dependencies become extremely important to the efficiency of transaction processing, especially if the resource cannot be shared (that is, if a principle of mutual exclusion is either inherent or enforced). In such cases, transactions (or operations) that depend on the resource become serialized on that resource, and thus, transactions that require the resource depend on (and wait for) the completion of transaction that has the resource.

Dependencies are generally depicted via a directed graph, in which the nodes represent either transactions or resources and arrows represent the dependency relationship. The graph that represents transactions that wait for some resource held by another transaction, for example, is called a "wait graph." Dependency graphs may be as simple as a dependency chain or even a dependency tree, or may be a very complex, and non-flat network.

The value of successfully managing complexity through automated means grows as the transactions being managed become more complex, as this uses computerization's principal strength: the capacity for managing tremendous amounts of detail, detail that would certainly overwhelm any single human worker, and threaten to overwhelm a human organization not equipped with computer tools.

Unfortunately, the cost of any error that may propagate, for example, down a dependency chain of simple transactions, or affect a net of distributed transactions, also increases. Moreover, the cost of identifying possible sources of error increases as the contextual background for a complex transaction broadens, as all elements, assumptions, and consequences of particular transition states that may be visited while the transaction is processing must be examined for error. One certainty is that the law of unintended consequences operates with harsh and potentially devastating impact on program designers and users who blithely assume that their processes will always operate exactly as they are intended, rather than exactly according to what they are told (and sometimes more telling, not told) to do.

Error-handling for complex transactions currently operates with a bias towards rescinding a flawed transaction and restoring the original starting state. Under this approach, only when a transaction has successfully and correctly completed is the computer program granted permission to commit itself to the results and permanently accept them. If an error occurs, then the transaction is rolled back to the starting point and the data and control restored. This "either commit or rollback" approach imposes a heavy overhead load on complex transaction processing. If the complex transaction is composed of a chain of single, simpler transactions, then the entire chain must be rolled back to the designated prior commit point. All of the work done between the prior commit point and the error is discarded, even though it may have been valid and correct. If the complex transaction is a distributed one, then all resources used or affected by the transaction must be tracked and blocked from other uses until a transaction has successfully attained the next commit point; and when a single part of the entire distributed transaction encounters an error, all parts (and the resources used) must be restored to the values established at the prior commit point. Again, the work that has been successfully performed, even that which is not affected by the error, must be discarded. With linked transactions or any mix involving possibly interdependent pseudo-transactions, no general solution to the problem of automated error recovery has heretofore been presented.

Furthermore, the standard approach treats all transactional operations as identical. Operations, however, differ as to their reversibility, particularly in computer operations. Addition of zero may be reversible by subtracting zero. But multiplication by zero, even though the result is boring, is not exactly reversible by division by zero. Non-commutable transactions are not differentiated from commutable ones, nor do they have more stringent controls placed around their inputs and operation.

A second method currently used for error-handling in complex transactions is the application, after an error, of a pre-established compensatory mechanism, also called (collectively) compensating transactions as noted above. This presumes that all errors experienced can be predetermined, fit into particular categories, and a proper method of correction devised for each category. Using compensating transactions introduces an inherent risk of unrecoverable error: compensating transaction may themselves fail. Dependence entirely on compensating transactions risks the imposition of a Procrustean solution on a correct transaction that has been mistakenly identified as erroneous, or even on an erroneous transaction where the correction asserted becomes worse than the error.

Inherent in the use of compensating transactions is an assumption that each individually defined transaction has a matching transaction (the "compensating transaction") that will "undo" any work that the original transaction did. When transactions are treated in isolation or are applied sequentially, it is pretty easy to come up with compensating transactions. All that is needed is the state of the system saved from the beginning of the transaction and a function to restore that state. (In essence, this is how one recovers a file using a backup copy. All that is lost is the intermediate correct stages between preparation of the backup and the occurrence of the error.) When transactions become interleaved, this simplistic notion of a compensating transaction no longer works and the implementation a bit trickier. In fact, a compensating transaction may not even exist for certain transactions. The compensating transaction may be selected and applied automatically by the transaction manager. Still, the process is much the same: the system is ultimately returned to an earlier state or its equivalent.

Automated support for compensating transactions requires that, for each transaction, a corresponding compensating transaction be registered with an error management system so that recovery can take place automatically and consistently. The rules for using compensating transactions become more complex as the transaction model departs further from the familiar "flat" model. Formally, compensating transactions should always return a system to a prior state. If multiple systems are recovered, they are all recovered to prior states that share a common point in time. If the atomic actions that make up a transaction can be done in any order, and if each of these has an undo operation, then such a compensating transaction can always be defined. Three guidelines have been published (McGoveran, 2000): (1) Try to keep the overall transaction model as close as possible to the traditional "flat" model or else a simple hierarchy of strictly nested transactions. (2) Design the atomic actions so that order of application within a transaction does not matter. (3) Make certain that compensating transactions are applied in the right order.

A transaction logically consists of a begin transaction request, a set of steps or operations, each typically (though not necessarily) processed in sequential order of request and performing some manipulation of identified resources, and a transaction end request (which may be, for example, a commit, an abort, a rollback to named savepoint, and the like). Because the state of the art typically processes each step in the order received, the management of affected resources is largely cumulative rather than either predetermined or predictive, even when the entire transaction is submitted at one time. Resource management, and in particular the scheduling of both concurrent transactions and the operations of which they are composed, may be either static or dynamic. Static scheduling uses various techniques such as conflict graphs to determine in advance of execution which transactions and operations may be interleaved or run concurrently. Dynamic scheduling uses various techniques such as locking protocols to determine at execution time which transactions and operations may be interleaved or run concurrently.

SUMMARY OF THE INVENTION

As outlined above, the usual interpretation of the ACID properties introduces a number of difficulties. The current interpretation of the atomicity property has resulted in an approach to error recovery that is costly in terms of both time and other resources in that it requires the ability to return affected resources to an initial state. The current interpretation of the consistency property recognizes consistent states only at explicit transaction boundaries, resulting in excessive processing at the end of a transaction and increased chance of failure. The isolation property is interpreted as strictly precluding the sharing of modified resources and operations, so that performance is affected and certain operations may be performed redundantly even when they are identical. Finally, the durability property is generally interpreted as requiring a hard record of only the final state of a transaction's resources (or its equivalent), thereby sometimes requiring excessive processing at commit or rollback. All of these taken together result in less than optimal use of resources and inefficient error recovery mechanisms. The traditional techniques for preserving the ACID properties, optimizing resource usage, and recovering from errors cannot be applied effectively in many business environments involving complex transactions, especially those pertaining to global electronic commerce and business process automation.

The current invention introduces a method of transaction processing, comprised of a set of sub-methods which preserve the ACID properties without being restricted by the traditional interpretations. The concept of atomicity is refined to mean that either all effects specific to a transaction will complete or they will all fail. The concept of consistency is refined to mean that whenever a class of consistency conditions apply to two states connected by a set of operations which are otherwise atomic, isolated, and durable as defined here, that set of operations constitute an implicit transaction. The isolation property is refined to mean that no two transactions produce a conflicting or contradictory effect on any resource on which they are mutually and concurrently (that is, during the time they are processed) dependent. The durability property is refined to mean that the final state of a transaction is recoverable insofar as that state has any effect on the consistency of the history of transactions as of the time of recovery. Thus, if the recovered state differs from the final state in any way, the durability property is a guarantee that all those differences are consistent with all other recovered states and external effects of the transaction history. Finally, a logical transaction is understood as a transition from one state in a class of consistent states to a state in another class of consistent states. This is similar to, but clearly distinct from, the concept that the interleaved operations of a set of serializable, concurrent transactions produces a final result that is identical to at least one serial execution of those transactions. Just as serializability provides no guarantee as to which apparent ordering of the transactions will result, so the new understanding of a logical transaction provides no guarantee as to which consistent state in the class of achievable states will result.

The present invention asserts that these refinements of the ACID properties and of logical transactions permit a more realistic computer representation of transaction processing, especially business transaction processing. Furthermore, these refinements permit transaction processing methods that include both the traditional methods and the sub-methods described in this invention. The new set of sub-methods used, both individually and together, make it possible to manage complex transactional environments, while optimizing the use of resources in various ways. These techniques extend to distributed transactions, and to business transactions which span both multiple individual transactions as, for example, in a business process, and multiple business entities as is required in electronic commerce and business-to-business exchanges.

In particular, these sub-methods include: (1) establishing and using consistency points which minimizes the cost of recovery under certain types of error; (2) transaction relaying which permits work sharing across otherwise isolated transactions, while simultaneously minimizing the impact of failures; (3) corrective transactions which permit error recovery without unnecessarily undoing work, without so-called compensating transactions, and while enabling the tracking and correlation of errors and their correction; (4) lookahead-based resource management based on dependencies which enables optimized resource usage within and among transactions; and, (5) dependency-based concurrency optimization which enables optimized scheduling and isolation of transactions while avoiding the high cost of locking and certain other concurrency protocols wherever possible. Each of these sub-methods is capable of being used in complex transaction environments (including distributed, linked, and mixed) while avoiding the overhead associated with traditional transaction management techniques such as two-phase commit, each can be used in combination with the others, and each of these are detailed in the description of the invention below.

Two of the sub-methods introduced here, consistency points and corrective transactions, address the problem of error recovery and correction. Consistency points differ from savepoints in that they add the requirement of a consistent state, possibly automatically detected and named. Corrective transactions differ from compensating transactions in that they effectively enfold both error repair and the correction, whereas compensating transactions address only error repair. One problem with the current approaches to handling errors that occur during complex or distributed transactions is that they fail almost as often as they succeed. A second problem is that they are difficult for the human individuals who experience both the problem and the correction, because they do not meet peoples' expectations of how the real world handles problems. A third problem is that they do not offer an opportunity to record both the error and the correction applied, which makes adaptive improvements harder to derive as much of the value of the experience (how the mistake was made and how it was corrected) is discarded after the correction is completed. A fourth problem is that they are relatively inefficient. Jointly, consistency points and corrective transactions overcome these problems.

The transaction relaying sub-method provides a means for efficient, consistent management of inter-dependent transactions without violating atomicity or isolation requirements, without introducing artificial transaction contexts, and while enabling resource sharing. Current approaches for linking inter-dependent transactions (through, for example, a single distributed transaction with two-phase commit, as chained transactions, or through asynchronous messaging) do not simultaneously insure ACID properties and efficient, manageable error recovery. One problem with current approaches is the high resource cost of ensuring consistency and atomicity (the later becoming a somewhat artificially expanded requirement). A second problem is the high cost of error recovery, inasmuch as the approach introduces difficult to manage failure modes, most of which are incompatible with the sub-method of corrective transactions introduced here. A third problem is that the approach, in an attempt to avoid the high overhead of distributed transactions, may permit inconsistencies. A fourth problem is that they may be compatible only with flat transaction models, while required business transactions and business processes cannot be implemented using a flat transaction model. Transaction relaying overcomes these problems.

The remaining two sub-methods, lookahead-based resource management, and dependency-based concurrency optimization, each enable efficient use of resources, especially in highly concurrent environments. One problem with current approaches is that they do not make good use of information known in advance of transaction or operation execution, but depend primarily on dynamic techniques with the result that hand-coded solutions may perform more efficiently. A second problem is that they may not be compatible with the method (or the individual sub-methods) introduced here, hence an alternative approach to resource management and concurrency optimization is required to make the other new sub-methods viable. Lookahead-based resource management and dependency-based concurrency optimization address these problems.

BRIEF DESCRIPTION OF THE DRAWINGS

In FIGS. 1–3, the thicker lines indicate the intended, error-free flow of work, while the thinner lines indicate corrective or ameliorative efforts once an error occurs.

DETAILED DESCRIPTION OF THE DRAWINGS

Figure 1:
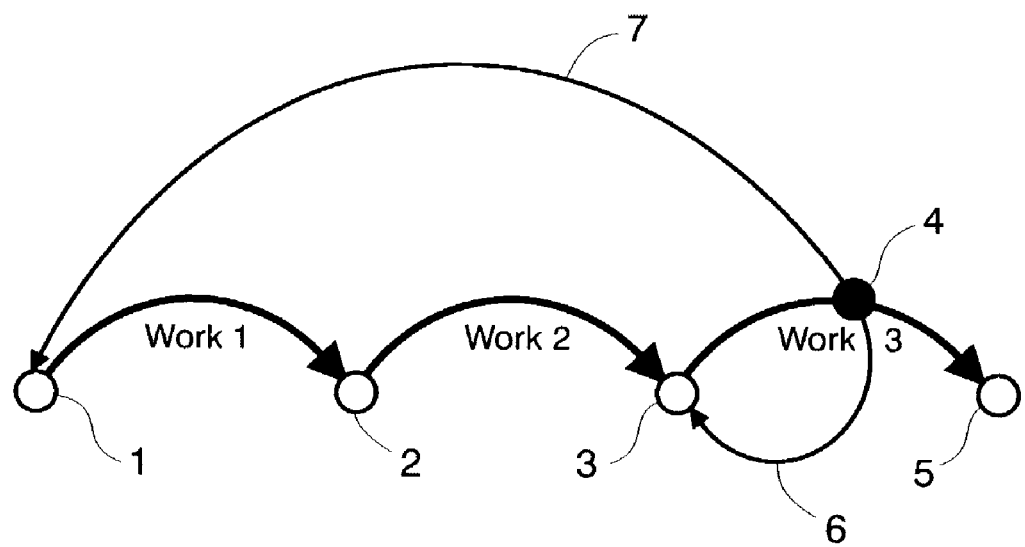
FIG. 1 is a transaction state graph contrasting transaction processing error recovery, with and without consistency points.

FIG. 1: At time t1 (1), a transaction is begun and the current state is effectively saved. A portion of work is done between t1 (1) and t2 (2) and another portion of work is done between t2 (2) and t3 (3). At time t4 (4) and before the transaction can reach its intended completion state (5) an error is detected. Without consistency points, the ATM initiates a rollback (7) and restores the initial state (1) at time t5, effectively losing all the work done prior to time t4 (4). The entire transaction must now be redone.

By contrast, if the transaction manager detects and saves a consistency point at time t3 (3), the ATM initiates a lesser rollback (6) and restores the saved consistency point (3) at time t5. The work done between t1 (1) and t3 (3) is preserved, and only the work done after time t3 (3) and prior to time t4 (4) is lost and must be redone.

Figure 2:
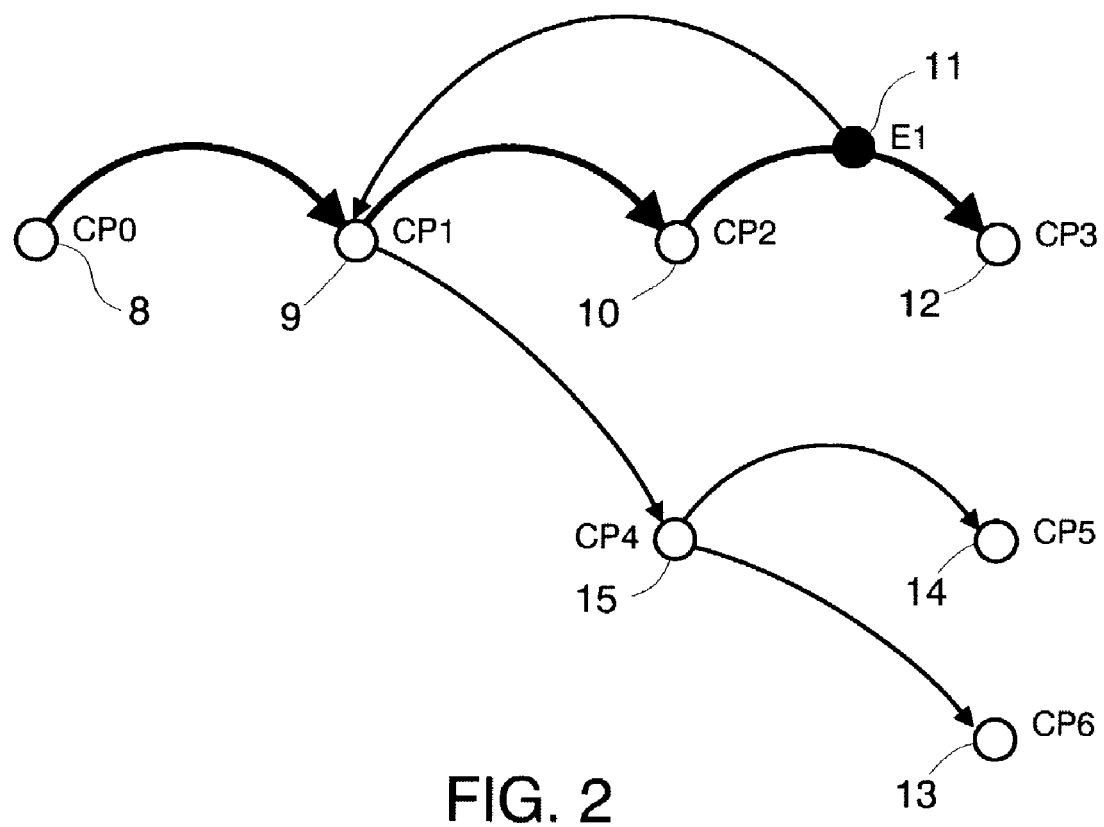
FIG. 2 is a transaction state graph illustrating a corrective transaction.

FIG. 2: Transaction A begins at consistency point CP0 (8), transitioning state through consistency points CP1 (9) and CP2 (10); then Transaction A commits and Transaction B begins. Transaction B encounters an undesirable condition E1 (11) before it can transition to consistency point CP3 (12) and commit. The ATM determines that condition E1 (11) is associated with consistency points of category C1, and that only CP1 (9) of prior consistency points CP0, CP1, and CP2 belongs to category C1. The ATM then restores the state to consistency point C1 (9). It further determines that reachable consistency points CP3 (12) and CP6 (13) belong to the same consistency category C2 while consistency point CP5 (14) belongs to consistency category C3. Transaction C is then executed as a corrective transaction, transitioning state from consistency point CP1 (9) to consistency point CP4 (15), and then Transaction D is executed transitioning state from consistency point CP4 (15) to consistency point CP6 (13)—an acceptable state—where it commits. A second alternative would have been to execute Transaction C as a corrective transaction, transitioning state from consistency point CP1 (9) to consistency point CP4 (15) and then execute Transaction E transitioning state from consistency point CP4 (15) to consistency point CP5 (14)—another acceptable state—where it commits.

Figure 3:
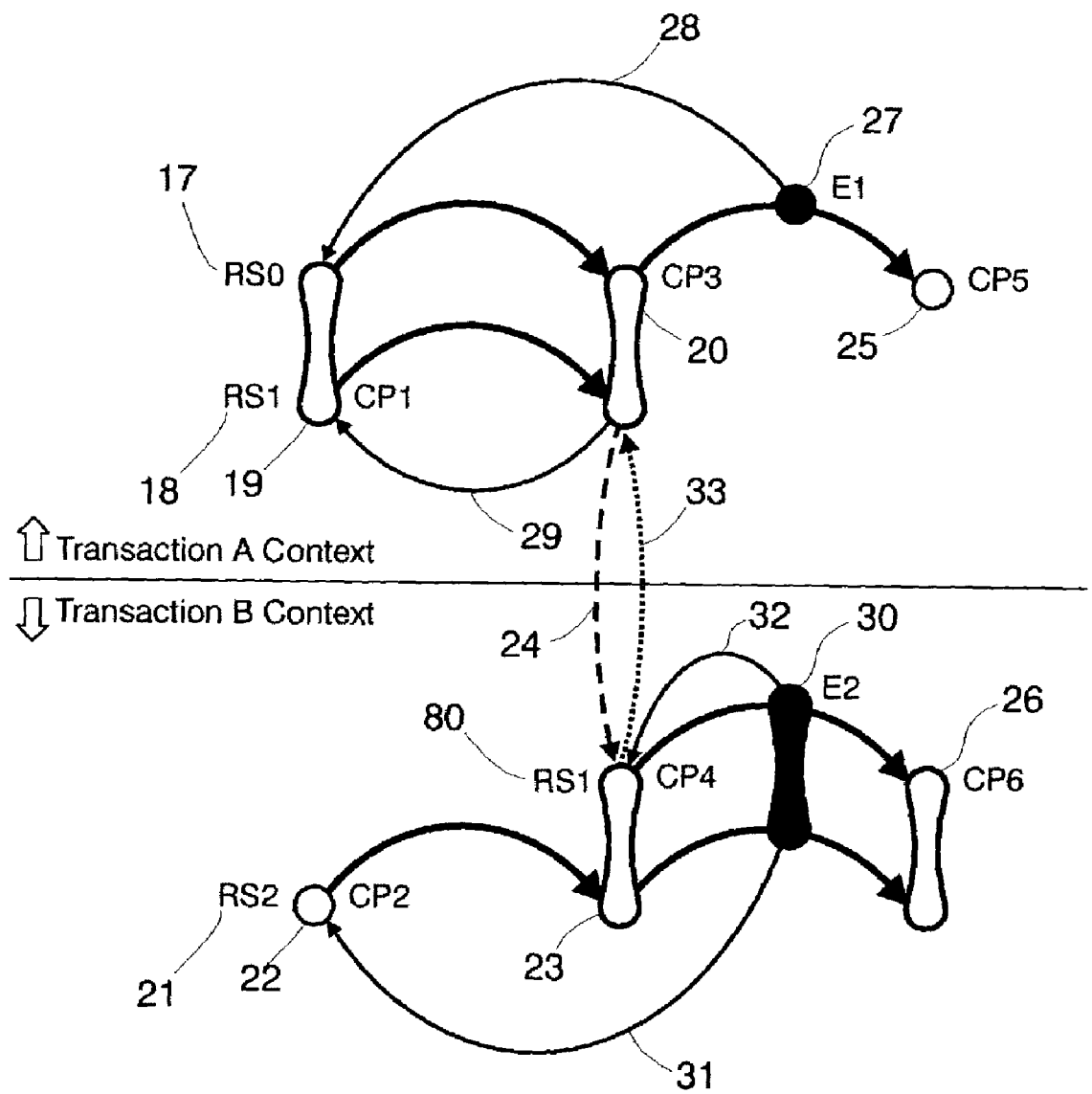
FIG. 3 is a transaction state graph illustrating transaction relaying.

FIG. 3: Transaction A begins to use resource sets RS0 (17) and RS1 (18), which are both in a consistent state, at consistency point CP1 (19). Both transition to durable consistency point CP3 (20), at which point Transaction A notifies the ATM that it will not subsequently modify RS1. Transaction B begins with resource set RS2 (21) in a consistent state at consistency point CP2 (22) and transitions it to consistency point CP4 (23). At CP4 Transaction B notifies the ATM that it requires resource set RS1 to continue. The ATM transfers (24) both control and the state of resource set RS1 at CP3 (20) from Transaction A to Transaction B at consistency point CP4 (23). If no errors occur subsequently, Transaction A continues, modifying resource set RS0, transitioning its state from consistency point CP3 (20) to consistency point CP5 (25) and commits. Likewise, Transaction B continues in the absence of subsequent errors, modifying resource sets RS1 and RS0, transitioning from consistency point CP4 (23) to consistency point CP6 (26) and commits.

If an undesirable condition E1 (27) occurs in Transaction A subsequent to consistency condition CP3 (20) and prior to commit, and after Transaction B has committed or is in-flight, the ATM simply restores (28) resource set RS0 to consistency condition CP1 (19). If Transaction B has aborted, the ATM also restores resource set RS1 (18) to consistency condition CP1 (19). (It is also possible to restore to consistency condition CP3 (20) and re-run the work that affects only RS0; although this is not shown in the diagram.)

If an undesirable condition E2 (30) occurs in Transaction B subsequent to consistency condition CP4 (23) and prior to commit, and Transaction A has committed or is in-flight, the ATM restores (31) resource set RS2 to consistency condition CP2 (22) and restores (32) resource set RS1 to consistency condition CP4 (23). If Transaction A is in-flight, the ATM also transfers (33) control of resource set RS1 (80) to the Transaction A context (18). If Transaction A has aborted, it further restores resource set RS1 (18) to consistency condition CP1 (19). (Again, it is also possible to restore to consistency condition CP4 (23) and rerun the work that affects both resource sets RS1 (80) and RS2 (21), without handing control over RS1 (80) back to the Transaction A context, although this is not shown in the diagram.)

Figure 4:
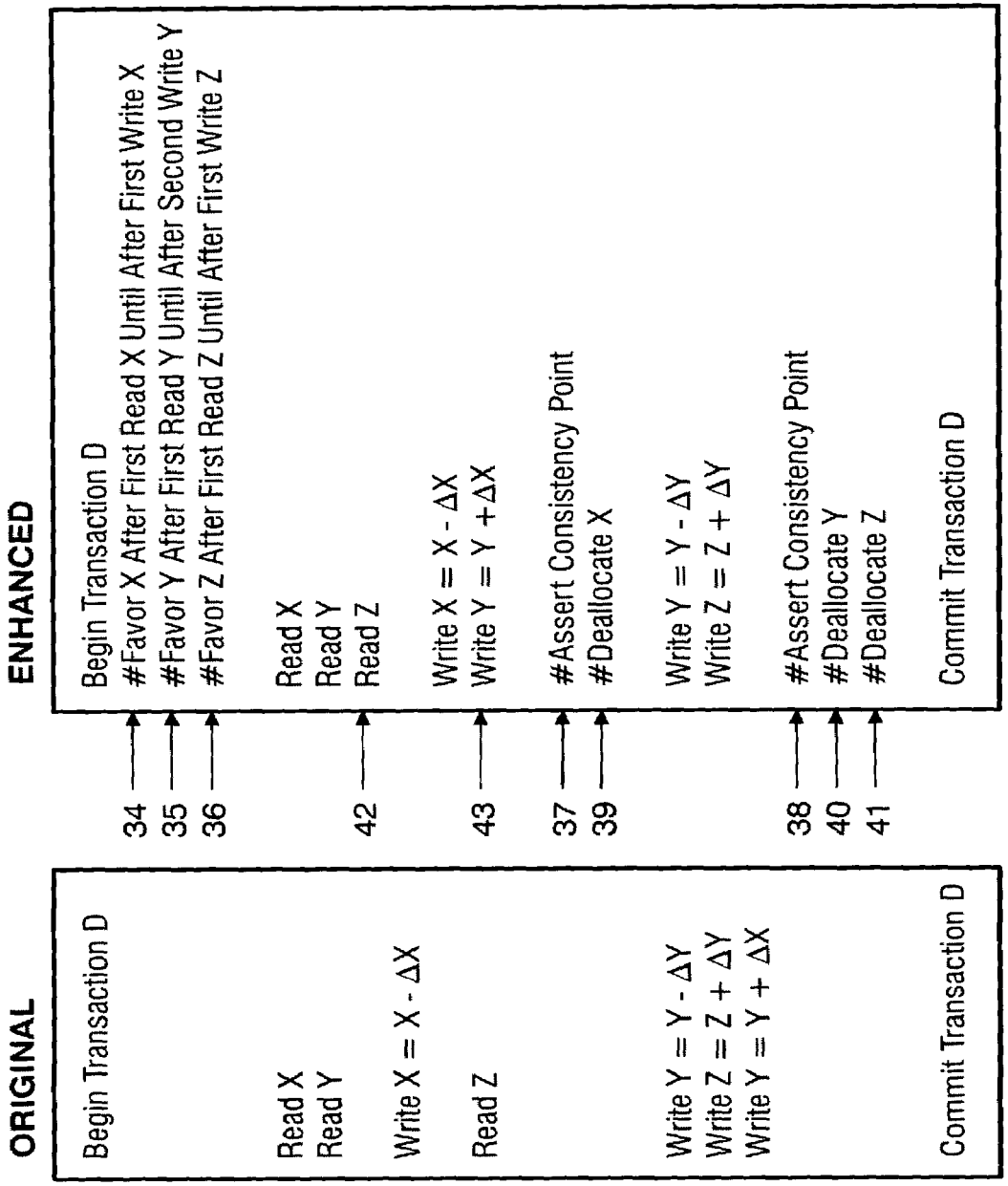
FIG. 4 is an example of code reorganization and optimization using lookahead resource management.

FIG. 4: The ATM analyzes and rewrites Transaction D from the Initial Definition (on the left hand side) to the re-structured Enhanced Definition (on the right hand side). Directives are inserted regarding favoring (34) (35) and (36), to assert consistency points (37)(38), and to deallocate resources (39)(40)(41). The "Read Z" step is performed earlier (42), thereby optimizing efficiency. The "Write Y=Y+ ΔX" step is also performed earlier (43), thereby enabling both interim assertion of consistency points (37)(38) and the early deallocation, after its last use in the transaction, of each resource (39)(40)(41).

Figure 5:
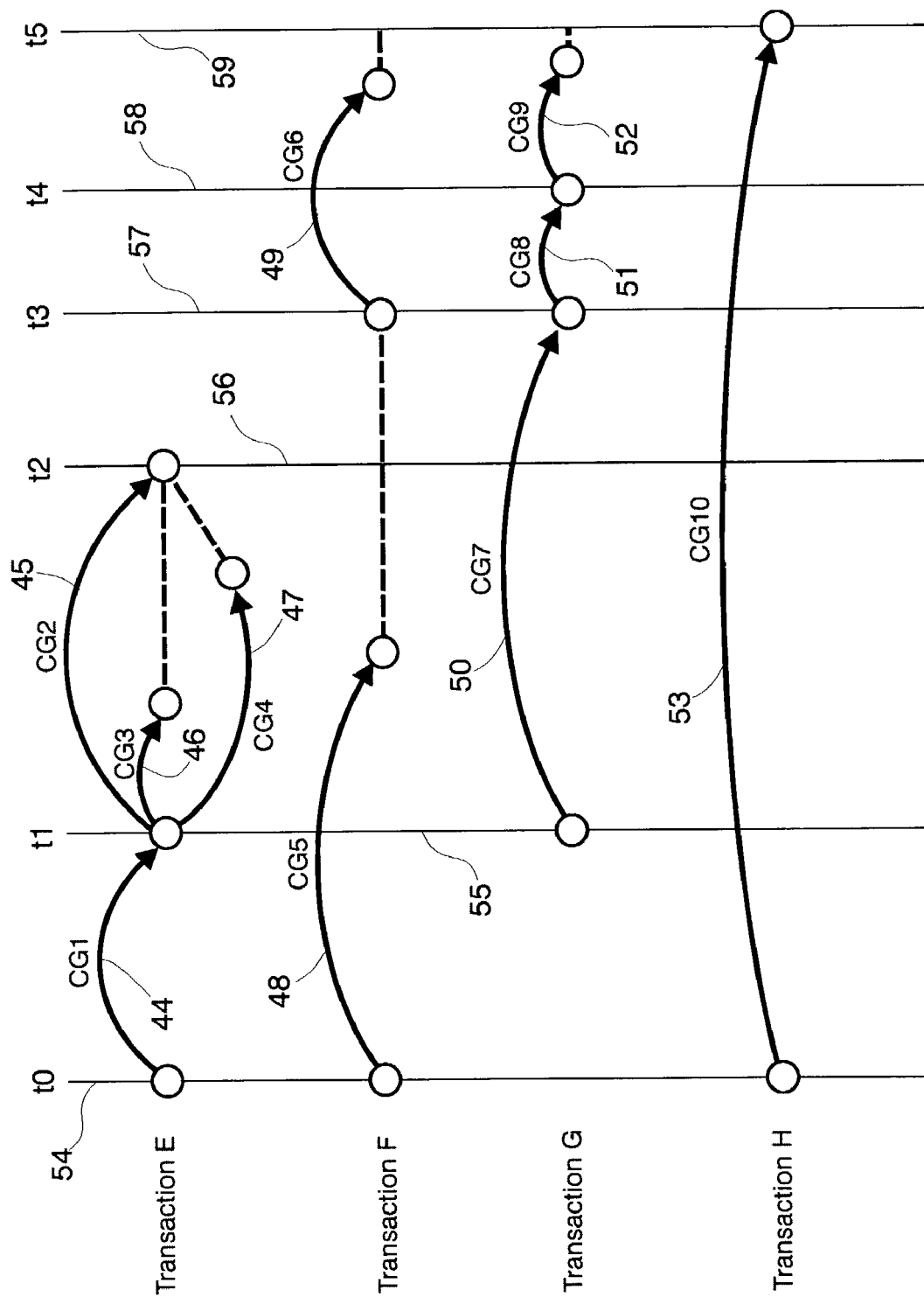
FIG. 5 is a transaction state graph illustrating an example (one possible alternative out of many) of dependency-based concurrency control.

FIG. 5: This shows the scheduling of four concurrent transactions E, F, G, and H. The ATM determines from dependency information that Transaction E consists of consistent groups CG1 (44), CG2 (45), CG3 (46), and CG4 (47), that Transaction F consists of consistent groups CG5 (48) and CG6 (49), that Transaction G consists of consistent groups CG7 (50), CG8 (51), and CG9 (52), and that Transaction H consists of a single consistent group CG10 (53). It further determines that CG6 (49) shares a dependency with consistent groups CG1 (44), CG3 (46), and CG4 (47), CG9 (52) shares a dependency with consistent group CG1 (44), and that there are no other dependencies among the transactions. Transaction H is not in the same conflict class as E, F, or G. Given this information, the ATM begins Transactions E, F, and H at time t0 (54), scheduling consistent groups CG1 (44), CG5 (48), and CG10 (53) for immediate and concurrent execution. At time t1 (55) after consistent group CG1 (44) completes, it schedules consistent groups CG2 (45), CG3 (46), CG4 (47), and CG7 (50) to run concurrently. At time t2 (56) after consistent groups CG2 (45), CG3 (46), and CG4 (47) have completed, Transaction B commits. After consistent group CG7 (50) of Transaction G completes at time t3 (57), consistent group CG8 (51) is scheduled to run. Also at time t3 (57) after Transaction B has committed, consistent group CG6 (49) of Transaction F is scheduled to run; and then at time t4 (58) the ATM schedules consistent group CG9 (52) to run. (If Transaction E has already committed, the ATM can schedule consistent groups CG8 (51) and CG9 (52) of Transaction G to run concurrently, although this is not shown in the diagram.) Because Transaction H cannot possibly be in conflict with Transactions E, F, and G, it is permitted to run to completion without further scheduling and without isolation otherwise enforced. At some time t5 (59) all the transactions will have completed and committed.

Figure 6:
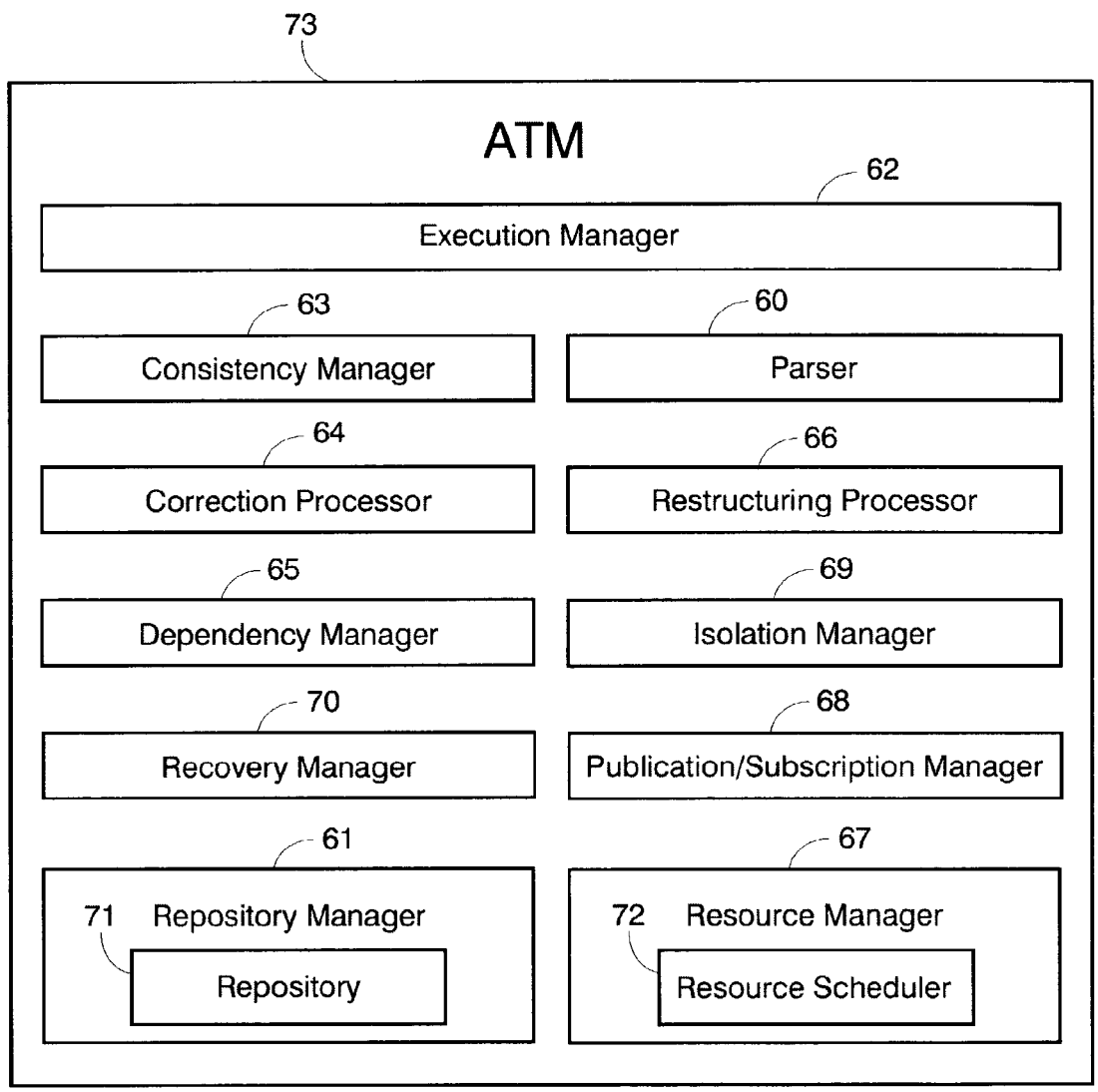
FIG. 6 is an overview of a component combination for the joint application of the submethods, implemented in an ATM.

FIG. 6: The ATM, in the preferred embodiment, contains all of the subunits referenced in this diagram. Due to the complexity of potential interconnectivity, which may be dynamically rearranged, it is infeasible to display all possible interconnections and hierarchies.

The Parser (60) has responsibility for interpreting or compiling transaction definitions, which it may receive from an external source or by reference to a transaction definition stored in the Repository (71) via the Repository Manager (61). The Parser may forward interpreted or compiled transaction definitions to the Repository Manager (61) for deferred execution or to the Execution Manager (62) for immediate execution. The Execution Manager (62) processes transactions, allocating and deallocating transaction contexts, passing directives and instructions to the appropriate ATM components, and orchestrating transaction scheduling, commit, rollback, and rollforward. The Consistency Manager (63) has responsibility for automatic identification of consistency points and verification of asserted consistency points. The Correction Processor (64) has responsibility for correlating abnormal conditions and consistency points, either by direct association, or through condition categories or consistency classes. Based on the transaction definition and possibly a business process definition, it may use various techniques to discover, optimally select, or create a corrective transaction and submit it to the Execution Manager (62). The Dependency Manager (65) has responsibility for interpreting dependency directives, detecting dependencies, identifying consistent groups based on dependencies and asserting the corresponding consistency points. The Restructuring Processor (66) has responsibility for altering the order of transaction steps based on information from the Repository (71), the Consistency Manager (63), and the Dependency Manager (65). The Repository (71) is also responsible for including internally derived resource management and consistency directives in the transaction definition. The Resource Manager (67) is responsible for accessing and updating resources, allocation management, scheduling, resource isolation, maintaining cache, and other resource constraints. The Resource Manager (67) is also responsible for detecting resource requirements, implementing resource management directives, and providing resource management directives to the Restructuring Processor (66). The Repository Manager (61) is responsible for coordinating all stored information, including dependencies, transaction definitions, associations, condition classes, consistency categories, subscriptions, and so on. The Publication/Subscription Manager (68) is responsible for processing publication and subscription definitions, detecting publication events, and notifying appropriate subscribers of publication events. The Recovery Manager (70) is responsible for evaluating, selecting, and directing recovery options, passing control to the Corrections Processor (64) if a corrective transaction is selected. The Isolation Manager (69) interacts with the Resource Manager (67) and more intensively the Resource Scheduler (72) to ensure the Isolation Property for every resource and transaction is correctly maintained, sending constraints and dependency information as needed to the Publication/Subscription Manager (68) and the Dependency Manager (65).

DETAILED DESCRIPTION OF THE INVENTION

Businesses work in an imperfect world, and attempt to impose their own order on events. Constantly in a state of flux, they persist in imposing 'acceptable' states through the efforts of all their employees, from the accountants running yearly, quarterly, weekly, or even daily accounts, to the zealous (or indifferent) stock clerks managing inventory.

When an error occurs, it is recognized because the result differs from what is expected. Results can differ from expectations in several ways, including computational results, resources consumed, catastrophic failures to complete the work, excessive time to complete the work, and so on. Typically, the business does not know either the explicit cause of an error or its full impact. For example, it may not know if data was corrupted (wrong account number), the procedure mistakenly performed (9*6=42), or the wrong procedure used (multiplied instead of divided). Obviously errors (including those of timeliness and resource overuse) must be prevented to the degree possible. Any undesirable effects of errors must be repaired and the desired effects asserted (correction—traditionally by resubmitting the corrected transaction). Furthermore, finding out which error occurred, and enabling those errors to be tracked, over time becomes more valuable than merely repairing and correcting each as it occurs. In this way the business can discover where it needs to focus attention on improving the overall process and improving its efficiency.

Overview of the Invention

The present invention is a method, consisting of a coordinated set of sub-methods, which enables efficient transaction processing and error management. By contrast with prior approaches, it is extensible to complex transactions and distributed business environments, and is particularly well-suited to business process management. The sub-methods are consistency points, corrective transactions, transaction relaying, lookaheadbased resource management, and dependency-based concurrency optimization.

In the preferred embodiment of the present invention, a system implementing this invention (1) continually transitions between automatically-detected stable (i.e. logically correct and permissibly durable) acceptable states (each is also known as a 'consistency point'), ensuring rapid and minimal recovery efforts for any error; (2) automatically enables inter-linked, possibly distributed, transactions to share intermediate work results at 'consistency points' through transaction relaying, moving from one acceptable state to the next; (3) efficiently manages I/O and storage use by identifying for each transaction (or procedure), in advance of execution, a set of data, resources, and operations depended upon by that transaction to move from one consistency point to its succeeding consistency point; (4) schedules the use of those resources in such a manner as to improve efficiency and concurrency while permitting dynamic scheduling of unplanned transactions; and (5) automatically implements repair and corrective efforts whenever a mistake is identified.

In an extension of the preferred embodiment, the system shares resources and data that are touched or handled by multiple subordinate parts of a complex or distributed transaction, rather than duplicating the same and letting each part have its own copy, or rather than locking all other parts out while each particular part operates with that same data and/or resources. This 'overlap' in effect becomes a window into the entire business' processes, a window that moves as transactions, or parts thereof, successfully and correctly complete—or when an error occurs, the effects are repaired, and failed work corrected. Moreover, all that needs to be maintained during the process of a particular sub-part of the transaction is the 'delta save', that is, the changes since the known consistency point which the chain last reached.

In yet a further extension, a system engages in transaction management by implementing transaction lookahead, or managing transaction dependencies, or any combination thereof.

Each of the sub-methods are further detailed and explicated below.

1. Consistency Points

Through the course of a transaction, it may happen that the set of resources enters a consistent state from time to time. Such a consistent state is referred to as a consistency point and may be detected automatically by the transaction manager or some other software subsystem, or may be manually asserted by the user (possibly via program code or interactive commands). Numerous methods for automatic detection of consistency exist in the literature and are well-known. Consistency points may be durable or non-durable. Durability determines the circumstances under which they may be used. In effect, a consistency point is a savepoint with the added requirement of consistency and the optional property of durability. When the system detects a potentially recoverable error, it can rollback to the consistency point by restoring the state as of the consistency point (exactly as it might to a synchronization point or were a savepoint to have been asserted). It may then optionally and automatically redo the work that was subsequently done (by, for example, reading the log or log buffers) in the hope that the error will not recur. This might be the case when, for example, (1) a deadlock is encountered (in which case the consistency point need not be durable) or (2) power fails (in which case the consistency point must be durable). Numerous methods exist for recovery to a synchronization point or savepoint, and are well-known. Rollback to a consistency point will, in general, be more efficient than rollback to the beginning of a transaction in a system which does not support consistency points.

These examples illustrate some of the value of consistency points:

automatic deadlock recovery—When a deadlock is detected, the usual response is to return control to the user (or program) with an error message or to select one of the participating transactions and abort it. With consistency points, the system can implement an internal retry loop which makes it very likely that the deadlock condition will not recur (for a variety of reasons). Such an internal retry loop is much more efficient than one implemented by the user (the usual approach to deadlock recovery). It is clearly more efficient than having the system automatically break deadlocks by the method of picking a "victim" of those transactions involved, and forcing it to fail, and more reliable than expecting the correct response to have been encoded into a program by a programmer.

automated savepoints—Savepoints are established by manual declaration of the user, either interactively or through a program, and as an added step in a transaction. By contrast, consistency points can be established by automatic detection that some particular set of one or more pre-defined consistency conditions have been met. This enables both automatic and manual rollback to the most recent consistency point.

categories of consistency points—Users (including business users, system designers and administrators) can define multiple sets of consistency conditions so that multiple, different categories of states, each consistent with respect to a particular set of consistency conditions, can be detected and named. Detection can be automatic and naming can be according to a pre-defined naming convention. A consistency point of category C1 is more general than a consistency point of category C2 if every consistency point of category C2 also belongs to category C1. Other rules of set theory apply and can be used to simply testing for consistency points of one or more categories using methods well-known to one familiar with the art.

categorized rollback—By establishing a relationship between a type or class of error (based, for example, on error code) or other detectable condition, and a category of consistency point (possibly based on name), the system can then rollback a transaction to an associated category of consistency point when that error is detected. If the associated category of consistency point has not been detected or asserted, traditional error handling techniques can be used. Because both the relationship between error type and category of consistency point, and the consistency conditions to be detection can be changed, the behavior of the system can be easily maintained. In one embodiment, this can be done without the necessity of modifying transaction processing programs since the relationship and the consistency conditions can be held in a database (for example) and determined at program execution time.

commit processing—When a transaction commits, the standard approach is to make the final state of all affected resources durable. If a transaction contains one or more durable consistency points, the state of resources that have not been modified since a consistency point involving those resources need not be made durable during commit processing. This, in effect, permits commit processing to be spread out over time and possibly using parallel processing, thereby eliminating hotspots and speeding commit processing.

power failure recovery—When power fails, the usual response is to enter system recovery processing once it has been restored. The canonical approach to system restart of transaction management systems is equivalent to first initiating rollback of each transaction uncommitted at the time of power failure, and then to initiate rollforward. If the rollback phase for uncommitted transactions is to the most recent consistency point, followed by notification to the user as to "where they were" according to system records, the amount of work that the system must do in order to restart and which the user must then redo, is substantially decreased. A similar approach can be used for recovery from certain other types of failure, such as storage media failures, and incorporating other standard recovery mechanisms as appropriate.

Unlike all prior art, the present invention's use of consistency is far more consistent, logical, and powerful. Most present-day DBMS products (e.g., IBM's DB2 or Oracle's Oracle 9i) implement only an extremely limited concept of consistency enforcement, generally known as integrity rule or constraint enforcement. However, while these products may verify that the changes made by a transaction are consistent with some subset of the known integrity rules at various times (e.g., after each row is modified, after a specific transaction step is processed, or before transaction commit), no product currently on the market establishes and uses internally valid and logically consistent "checkpoints" (i.e. consistency points) to which the transaction can recover (perhaps automatically). Nor do they permit the user to request the establishment of consistency points, to assert consistency points (except implicitly and often erroneously at the end of a transaction), or separate consistency points from synchronization points (as, for example, between volatile memory and durable storage). Other advantages and uses of consistency points are further detailed below as they interact with other elements of this invention.

By extension, the method of consistency points can be applied to pseudo-transactions, physical transactions, logical transactions, and business transactions.

2. Transaction Relaying

Transaction relaying refers to the method of moving the responsibility for resource isolation and consistency in a window from transaction to transaction, much like the baton in the relay race, and permitting sharing of that responsibility under certain conditions (explained below). By further analogy, and for the purpose of explaining transaction relaying in its most simplified form, two transactions A and B become like runners in a relay race (football game). The baton (football) is a resource that A must pass to B without dropping (corruption). A conflicting transaction C is like a member of the competing team that would like to acquire control of the baton (football) from A and B. By passing the baton without either runner slowing down (permitting B to gain access to the resource held by A prior to commit), there is no opportunity for the competing team to acquire control (for conflicting transaction C to gain control of, let alone alter the resource). Furthermore, the entire process is much more efficient than if the runners were to stop in order to make the transfer.

Consider a transaction B having either a semantic or resource dependency (or both) on transaction A. For example, suppose that a particular business process consists of transactions A and B, and that there is an integrity rule or constraint, or a dependency that requires transaction B must always follow A because it relies upon the work done by A. In other words, some portion of the final state of resources affected by A (the output of A) is used as the initial state of resources required by B (the input of B). By the definitions of transaction and consistency point, the final state of A is a consistency point, even before A commits. Under the usual approaches we must either (1) accept the possibility that the final state of A is altered by some transaction C before B can access and lock the required resources (the sequential transaction scenario), (2) accept the possibility that the state of resources needed by B is different than the state of those same resources as perceived by some other transaction (chained transactions), or (3) run transactions A and B combined in a distributed transaction, accepting the fact that all resources touched by either A or B will be locked until B completes (the distributed transaction scenario).

Transaction relaying recognizes the fact that A and B may share the state of the resources that B requires at least as soon as A enters the final consistency point for those stated resources and has made that final state durable (assuming durability is required). Unlike chained transactions, it need not wait until A is ready to commit. It need not even wait until locks are released. Rather, the transaction manager, lock manager, or some other piece of relevant software either transfers ownership of those locks directly to B or establishes shared ownership with B (as long as only one transaction has ownership of exclusive locks on a resource at any given time if the ACID properties are desired), and never releases them for possible acquisition by C. Unlike the sequential transaction scenario, there is no possibility that C will interfere in the execution of B. Unlike the chained transaction scenario, transaction relaying does not require transaction A to have committed, the beginning of transaction B to be immediately after the commit of transaction A, the commit of A and begin of B to be atomically combined in a special operation (indeed, B may already have performed work on other resources), transactions A and B to be strictly sequential, or transaction B to be the only transaction that subsumes shared responsibility for resources previously operated on by transaction A. Unlike the distributed transaction scenario, resources held by A, but upon which the initial state of B does not depend, are released as soon as A completes and there is no two-phase commit overhead. Unlike split transactions, transaction relaying does not introduce artificial transaction contexts, can be fully automated without sacrificing consistency, and yet enables collaborative transaction processing in which work groups can communicate about the status and intermediate results of their work (including negative results).

An extension of the method is to permit transaction B to have done additional work on other resources prior to the consistency point discussed above. Another extension of the method is to permit A to do work on other resources after the consistency point discussed above. A further extension of the method is to permit transaction A to do work after the consistency point discussed above, so long as no consistent state on which transaction B depends is ultimately altered by transaction A.

Yet another extension of the method is to permit transactions other than transaction B to have a similar relationship to transaction A, involving possibly different resources and possibly different consistency points. The method preserves the ACID properties of all transactions as long as no more than one transaction in effect has responsibility for modification of a shared resource at any particular time, and that transaction can rollback the state of those resources to the most recent durable consistency point in which they are involved. If durability is not a recovery requirement (as, for example, during deadlock recovery), then the consistency point need not be durable.

By extension, under transaction relaying, if the initial state of a resource as needed by one or more transactions including B happens to be an intermediate state of that resource produced by A, it may be made available to those transactions long before A commits if the following conditions are true (other conditions may enable this as well): (1) at most one transaction of those sharing responsibility for recoverability, isolation, and consistency of resource modifies those resources subsequently, (2) the intermediate state is a consistency point, and (3) the intermediate state is recoverable (though not necessarily durable). These conditions are intended to guarantee that the result of A and B with transaction relaying around a consistency point is equivalent to some serializable interleaving of transactions D, E, F, and G, where D is the work that is A does before the consistency point, E is the work A does afterward, F is the work B does before the consistency point, and G is the work B does after the consistency point. Other sets of conditions or rules that would produce this result are possible.

Moreover, the intermediate state produced by A could just as easily have been produced by B (or other specific transactions) had the instructions to do so been inserted in B (or those other transactions) at some point prior to that at which the intermediate state of A is accessed by B. Transaction restructuring such as this under transaction relaying may be used to improve processing efficiency and performance. By further extension, under transaction relaying a group of transactions can share multiple intermediate states. This may become important when scheduling subordinate parts of a complex transaction for the most efficient processing; transaction relaying allows a transaction management facility to balance work amongst 'subordinate' transactions by including instructions such as those described in all subordinate transactions (or at least establishing the means for such inclusion when needed) and then selecting which of those subordinate transactions actually perform the work so as to promote efficiency, either in advance of execution or dynamically during execution.

In transaction relaying, both A and B share control over isolation of shared resources. For example, they would share ownership of the locks on the shared resources is locking were used to control isolation. Optimally, and in order to preserve the consistency and isolation properties, both A and B must have completed before transactions other than A and B perceive locks on those resources to have been released. If B completes before A, B relinquishes its lock ownership and A retains lock ownership until A completes. If A complete before B, A relinquishes its lock ownership and B retains lock ownership until B completes. In this way, both A and B (all owners of the shared resource) must release locks on shared resources in a manner consistent with the type of lock held (e.g., share versus exclusive locks) and the concurrency control mechanism before other transactions can access the resource. If A completes before B, B has lock ownership. If A and B complete simultaneously, or whenever A and B have both completed, lock ownership reverts to the resource manager and so locks are effectively released. In order to preserve serializability, the two-phase locking protocol applies to the shared resource as if a single transaction were involved. The usual rules of lock promotion or demotion apply. Insofar as external transactions (that is, transactions not involved in sharing the resources in question via transaction relaying) are concerned, a resource shared by A and B is locked in the manner which is most exclusive of the types of access requested by A and B. Similar rules may apply to lock scope escalation (e.g., row to page) and to transaction relaying involving more than two transactions.

By obvious extension, transaction relaying can be used in systems that employ non-standard concurrency control schemes and enforce isolation through mechanisms other than locking; appropriate adjustment to the specific mechanism that enforces isolation is then required to permit the sharing of resources at consistency points.

By extension, transaction relaying enables a transaction management facility (or other appropriate software systems) to remove redundant operations performed by a group of transactions and assign those operations to a specific transaction or transactions, thereby improving the overall efficiency of the system. Such a facility can determine which operations among a group of transactions are redundant through automatic means well-known to those familiar with the art (for example, pattern matching), to be informed of those redundant operations by some other agent such as a human individual knowledgeable about the intent of the transactions in the group, or some combination of the two.

Transaction relaying can be extended to arbitrarily complex collections of concurrent and interdependent transactions, even if those transactions were running under distinct transaction managers in a distributed computing environment. In such cases, the means for isolation enforcement will typically be distributed, but two-phase commit processing is not required across those transactions involved in transaction relaying (although it need not be precluded). Numerous mechanisms for distributed isolation enforcement exist and will be well known to one familiar with the art. Indeed, once the method of transaction relaying has been explained as it applies to two transactions ("A" and "B"), extensions to arbitrarily complex collections of concurrent and interdependent transactions, including those spread across a distributed computing environment however geographically dispersed or however many business entities may be involved, will be obvious to one trained, competent, and versed in the art.

By extension, this method of the present invention can be implemented so that transactions publish their states and/or consistency conditions at consistency points and permit other transactions to subscribe to the state of associated resources. A variety of methods may be used to determine which of the subscribing transactions will gain write permission over the associated resources and in what order. By further extension, the group of subscribing transactions can be treated to various methods of concurrency optimization, including the method of dependency based concurrency optimization described below. By extension, the method of consistency points can be applied to pseudo-transactions, physical transactions, logical transactions, and business transactions.

In another extension of the present invention, a locking flag is used to denote the dependency upon each particular resource (including data elements), and to transfer control over and responsibility for such to the transaction which has yet to attain a consistent state with the same, thereby allowing intermediate, partial, or distributed transactions to process and reach completion or acceptable states without necessitating the entirety of a complex or distributed transaction to successfully conclude.

3. Corrective Transactions

Corrective transactions provide an alternative to both compensation and rollback in circumstances in which the desired result of a transaction can be understood as producing a state that meets a particular set of consistency conditions. For example, an ATM transfer transaction may have as its key consistency conditions the crediting of a specific account by a specific amount of money, and maintaining a balance of debits and credits across a set of accounts (including the specified one).

In the event that an error occurs during transaction processing, a corrective transaction appropriate to the error is invoked. Rather than restoring the initial state of a set of resources as would either a rollback or a compensating transaction, a corrective transaction transforms or transitions the state of the affected set of resources to a final state which satisfies an alternative set of consistency conditions (integrity constraints and transition constraints). The alternative set of consistency conditions constrain the final state to one of possibly many acceptable states and may be, for example, completely distinct from the initial set or may be a more general category of consistency conditions. For example, consider a simple business process consisting of a two predefined but parameterized transactions, a funds-transfer transaction (parameterized for transfer amount and two account numbers) and a loan transaction (parameterized for loan amount but with fixed account number). If an attempt to transfer a specified amount between two accounts fails because of insufficient funds, an automatic corrective transaction might loan the user the required funds, thereby expanding the consistency conditions to include an account not owned by the user with respect to balancing credits and debits. In this example, the corrective transaction might be manually predefined by the bank and caused to run as part of an error handling routine. Similarly, rather than debiting the explicitly specified account (for example, checking), it might debit an alternate account (for example, savings or an investment account).

This method of the present invention replaces the usual fixed set of consistency conditions with a category of such sets and invokes an auxiliary set of actions (the corrective transaction) that will transform the current state into one that satisfies some set of consistency conditions belonging to that category. That is, the traditional concept of the consistency property for transactions is refined such that the options for achieving a consistent state in the completion of a transaction are broadened. For each set of consistency conditions defining the end state of a transaction, each of the other sets of consistency conditions belonging to its category constitute an acceptable set of consistency conditions. This concept of acceptable sets of consistency conditions mimics the real world of business, in which errors are common and a strictly pre-determined result of work is not possible. Rather, those who perform work in a business context strive to achieve some acceptable result, where acceptability is determined by satisfaction of a number of alternative sets of constraining conditions and is often associated with business risk and opportunity assessment.

This method is particularly valuable when a set of linked interdependent transactions is involved and a flat transaction model does not apply. For example, a classic problem of this nature involves the scheduling and booking of a travel itinerary. It is not uncommon that the ideal routing, carrier, and timing are unavailable for every segment of a multi-segment itinerary, but that some compromise alternative is available. Each segment is often reserved and booked via a separate transaction, and cancellation penalties after more than a few minutes may preclude arbitrary rescheduling. Possible compromises constitute alternative consistency conditions, possibly ranked by the traveler's preference. If a transaction to book a particular segment of the itinerary fails, a corrective transaction can book an alternative for that segment. For example, it might involve booking a flight to an airport near the original segment destination and a rental car with the attendant compromise of less time between flights. Similarly, a corrective transaction might cancel a certain number of already scheduled segments in order to assert a more viable alternative schedule. The segments to be cancelled might be selected, for example, based on minimizing any negative financial impact on the overall cost of the itinerary.

Business processes do not always lend themselves to such simple models as those assumed by existing approaches to transaction processing: often they involve interleaved multi-hierarchies and networks. The processes a business uses to correct for errors do not always return the business to a prior state as is assumed in other approaches to transaction error handling (it would be to costly to do so). Rather, the business is transitioned to some acceptable state and the nature of this state made available to those portions of the business that have some dependence upon it. Notice the repeated reference to "some acceptable state" instead of the more familiar technical notion of a specific internally consistent transaction end state. Obviously, businesses do not follow a rigid set of rules of consistency as a database might. However, it should be equally obvious that some action will be taken if the business is not in an acceptable state. Rather than ignoring this approach, depending entirely on manual corrections (difficult if not impossible at today's transaction volumes), or insisting that the map must be the territory, the present invention actively attacks the problem by defining consistent and acceptable states to which the business process will move when it becomes flawed, states from which it may resume normal transaction management once again.

In a business process, the various constituent and linked transactions (including pseudo-transactions) often create a complex network of steps with many decision branches and concurrent sub-processes. Many portions of the process are designed to handle exception or error conditions. If a transaction fails, then rollback and redo, or rollback of a transaction that includes a decision branch, may not be a reasonable option. In particular, such a recovery mechanism will often consume so much time or other resources that the business process is no longer viable. The method of corrective transactions requires that one identify a state that would have been reachable had a different portion of the process been activated (that is, a different branch had been taken), and that satisfies an acceptable set of consistency conditions. Each such state is designated as an alternative end state. The failed transaction is then rolled back to the most recent state for which a transaction or set of linked transactions (the corrective transaction) exist that will transition from the consistency point to an alternative end state. This point may be the current error state (and possibly inconsistent), or it may be the most recent consistency point. The corrective transaction is then run.

The method of corrective transactions requires that each business, logical, or physical transaction submitted to the system, and which is to be subject to the benefits of the method, be identified according to the consistency conditions that will be enforced on the set of resources affected by that transaction or that such consistency conditions be automatically discoverable by the system. Such consistency conditions might, for example, be stored conveniently in an online repository so as to be accessible to the transaction manager, other appropriate software, or a human individual. Whenever an error occurs that results in the failure of the transaction (thereby failing to establish a state among the preferred final states), the failed transaction is returned to a recoverable consistency point (the most recent one in the preferred embodiment). The error is classified (in the preferred embodiment according to the nature of the most recent consistency point) and the corresponding set of consistency conditions on the affected resources is established. A transaction (the corrective transaction) is then invoked which will transform the affected resources from the state of the most recent consistency point to a state that most closely approximates the intended state and satisfying the new consistency conditions (we refer to these as "acceptable conditions"), assuming that such a transaction exists. In the event that no such corrective transaction exists, the failed transaction is then returned to an even earlier consistency point, and an appropriate corrective transaction invoked. The process is repeated until an acceptable set of consistency conditions is reached. By extension, this iterative process might be replaced by other techniques which achieve an equivalent result, examples of which are described below.

In one embodiment, the establishment of a target set of acceptable conditions is determined automatically, for example by means as diverse as rule-based inference based on error class, the use of a theorem prover to determine conditions which will permit the transaction to complete, or a catalog lookup. In another embodiment, the establishment of acceptable conditions (or equivalently a transaction that will produce those conditions) is determined by an interaction with a suitably authorized person. One familiar with the art could easily specify numerous other means to determine the acceptable conditions based on a combination of class of error, recoverable consistency points within the failed transaction, and consistent states accessible by executing one or more transactions.

In one embodiment, the determination of the steps in the corrective transaction (that is, its definition) are fixed in advance and there is one such transaction for each class of error. In another embodiment, the steps which constitute the corrective transaction (which themselves might be either implicit or explicit transactions) are determined automatically using, for example, a theorem-prover which reasons from the consistency point (initial state as axioms) to a final state which meets the acceptable conditions, the steps of the proof being the steps in the corrective transaction. In an alternative embodiment, back chaining is used to start from an arbitrary, potential state that meets the acceptable conditions and as defined, for example, as part of an overall business process schema, incorporating steps from a pool of pre-defined steps, operations, or transactions until the state given as the consistency point was reached. The incorporated steps in reverse order of discovery then define the steps of the corrective transaction. In such an embodiment, both the failed transaction and the corrective transaction might be business transactions consisting of ordered activities or transactions, thus each being portions of a business process, possibly involving human interaction to accomplish business activities.

In another embodiment the selection of acceptable conditions, acceptable state, and sequence of steps that constitute the corrective transaction may be optimized using one or more of a variety of optimization techniques (these will be well-known to those familiar with the art) to meet given optimization goals. For example, the optimization goals might optimize for minimum resource usage, shortest execution time, least human interaction required, and the like. Similarly, the members of the set of acceptable conditions may be possibly prioritized or ordered based on some arbitrary optimization criteria, and subsequently selected as needed through automated or manual means.

It is well within the means of the average professional skilled in the relevant arts to extend the concept of a corrective transaction to more complex scenarios involving multiple transactions of which is desired some group behavior. A common example occurs in practice in the context of process management and workflow. By a process we mean a collection of interdependent transactions (including possibly business transactions, logical transactions, and pseudo-transactions) that transform the state of a set of resources in a well-defined though not necessarily strictly deterministic manner, that manner being identified by a collection of transition rules (integrity constraints) which specify the permissible (partial) orderings of those transactions in time. Certain connected subsets of these transactions may themselves have atomic properties though not all of the ACID transaction properties, and so are considered pseudo-transactions. In some embodiments of a process, some or all of the transactions constituting the process may not be true transactions in the strict sense of the word and may be referred to as tasks, activities, business functions, and the like. (Indeed, the individual operations of any type of transaction can be considered to be a process.) For example, it may be difficult in practice to enforce the isolation property across these transactions: thus, the result of some transaction deep in the dependent chain (or tree or net) may influence the outcome of some transaction that is not one of those in the atomic group. For practical reasons (performance, lack of control, etc.), we may not be able to use distributed transactions or compensation. Both distributed transactions and compensation may furthermore be undesirable simply because they return the process to an initial state for the atomic group of transactions rather than moving it forward to an acceptable state and meeting acceptable conditions.

The method of corrective transactions permits analysis of a process schema of which a failed transaction is a part, the supplementing of the process as necessary with interactive input, and determination of a partially ordered set of transactions or actions (this set constituting the corrective transaction) that will transition from the current state to a state that is approximately—in terms of consistency goals—the same as would have been achieved had all gone well. How closely the corrected state approximates the one that would have resulted is entirely under the control of the system designer, constrained only by limitations imposed by the intended application or the real world.

A process often contains multiple alternate paths specifying the work to be done and leading to various states or conditions satisfying various consistency conditions, the alternate paths being selected either singularly or severally at a branch point in the process. Thus, from a branch point it may be possible to achieve a certain amount of work and an associated acceptable state in multiple ways, some more "consistent" or more ideal than others. It may even be able to achieve exactly the ideal acceptable state by an alternate path. Such an alternative path constitutes the corrective transaction. It may involve using different resources, require doing some work that would not otherwise have been done, require leaving some otherwise desirable work undone, require supplementing the process with interactive input, and so on.

In further extension to the preferred embodiment of this submethod of the present invention, a cost-benefit approach (similar to that sometimes applied to compensatory transactions) is used. Traditional compensating transactions are used when the combined cost of undo followed by redo is relatively small and has minimal impact on the rest of the system, when there are no context-dependent side-effects involved, when there are commutable transactions at every stage, or when an undo followed by redo is unlikely to cause errors in some other portion of the system (given the resource cost and especially in terms of time delays). Otherwise, a corrective transaction is used to transition directly to an acceptable state which then need not be the original target state.

In a further extension of the preferred embodiment of this submethod of the present invention, this method permits manual input to define and apply the corrective transaction to the current state to reach the desired acceptable state.

In a further extension of the preferred embodiment of this submethod of the present invention, this method uses previously-determined, policy-driven programming implementing pre-set rules of the business to derive, from the difference between the desired acceptable state and the current but incorrect state the nature of the corrective transaction, and then automatically applies the corrective transaction to the current state to reach the desired acceptable state.

In a further extension of the preferred embodiment of this submethod of the present invention, this method uses methods such as goal-oriented programming or genetic algorithms to derive, from the difference between the desired acceptable state and the current but incorrect state the nature of the corrective transaction, and then automatically applies the corrective transaction to the current state to reach the desired acceptable state.

In one alternative extension of the above further extension to the preferred embodiment of this submethod of the present invention, this method uses backward-propagating logic ('back propagation') to derive, from the difference between the desired acceptable state and the current but incorrect state the nature of the corrective transaction, and then automatically applies the corrective transaction to the current state to reach the desired acceptable state.

In an alternative extension of the last-named extension of the present invention, the method uses matrix, linear, or other algebraic algorithms to calculate the least-cost, highest-benefit corrective transaction to the current state to reach the desired acceptable state, and then automatically applies the corrective transaction to the current state to reach the desired acceptable state.

In another alternative extension of the present invention, the method uses single-element redefinition algorithms to calculate the least-cost, highest-benefit corrective transaction to the current state to reach the desired acceptable state, and then automatically applies the corrective transaction to the current state to reach the desired acceptable state.

In another alternative extension of the present invention, the method uses any of the above-named techniques to calculate the corrective transaction to be applied to the current state, but only attempts to satisfy the minimally-acceptable set of conditions when attempting to derive the corrective transaction.

In another alternative extension of the present invention, the method uses any of the above-named techniques to calculate which corrective transaction will reach the closest possible alternative end state to the minimally acceptable consistent state, applies the corrective transaction, and then reports the remaining difference for manual implementation of the final step to reach said minimally acceptable consistent state.

By extension, the method of consistency points can be applied to pseudo-transactions, physical transactions, logical transactions, and business transactions.

4 Lookahead-based Resource Management

Existing resource management methods do not take into account available information about either the operations and resources involved in a transaction, or the transactions (and therefore the resources) involved in a business process. Thus, for example, if a first step involves a request to read a data resource and a subsequent step involves a request to modify that same data resource, the probability of that data resource being found in cache is not influenced by any determination that the subsequent step will or will not require that data resource. Some DBMS products attempt to keep all data resources, once accessed, in cache (or some other high speed storage). Various algorithms may be used for determining when cache, or some portion thereof, can be overwritten (for example, a least recently used algorithm and its many variants). Other DBMS products may influence the probability that certain data resources will be kept in cache for a longer time based on statistical patterns of access. For example, certain types of requests involve sequential reading of large amounts of data resources and it makes sense to "pre-fetch" the next group of data in the expectation that the sequential reading will continue. As another example, certain types of cursor activity in a relational DBMS strongly suggests that the data resource initially read will be subsequently updated, as with SQL requests of the form OPEN CURSOR . . . FOR UPDATE . . . . None of these methods has the advantages of predetermining the need for resources.

Lookahead-based resource management is a submethod of the present invention that enables optimized automation and execution of a transaction or group of transactions, particularly feasible and appropriate for complex transactions as defined above. This is accomplished by making some or all resources (such as data or other resources) that will subsequently be used in processing a transaction or group of transactions explicitly known to the software responsible for processing said transaction or group of transactions in advance of the need to execute said transaction or group of transactions. The optimized management of those resources needed to process the transaction or group of transactions, and possibly other resources, is enabled by means to inform the software responsible for processing and/or optimization (the 'Transaction Process') of said resources either by directive or by inference in association with the definition of the request for said processing. This is done by making the definition of one or more steps in a transaction (or group of transactions) known by one of several means to the Transaction Process in advance of the request to process said step or steps. From such an advance definition, the Transaction Process can infer the resources necessary to perform said step or steps. Alternatively, and as a means of further efficiency, the originator of the request definition (whether a human, program, or machine) can incorporate the identification of the resources directly in the definition. As a means of yet further efficiency, the originator can include within the request definition directives that instruct the Transaction Process as to how to optimally manage resources in anticipation of steps of a transaction or group of transactions.

In the preferred embodiment of this submethod, the entire transaction definition is made known to the Transaction Process in advance of the initial request to begin processing that transaction (possibly by name or some other transaction identifier). The definer of the transaction identifies at transaction definition-time the data resources that should be highly favored for cache retention, at what step to begin such favoring, and at what step to remove or reduce that favoring. As a further efficiency, these identifications may be aided through automated techniques such as monitoring the use of resources while the transaction is being run, thereby identifying those resources and determining at which points particular resources are no longer required. In this embodiment, these resources are accessed once and then maintained in cache until the last step that needs said resources. In the event that there is insufficient cache, other secondary methods of cache management may then be used. As a further efficiency, resources are acquired and released at consistency points, thereby reducing the likelihood that an error or rollback condition will force resources to be released. Thus, as a specific example, a transaction containing a step to read some data followed, perhaps with intervening steps, by a step to modify that same data might be predefined as a stored procedure (for example) and invoked by name. Following the transaction definition, the Transaction Process marks the data read (as a consequence of the first step) to be highly favored for retention in cache until the second step completes. The cache management algorithms used by the Transaction Process (well known to those familiar with the art) are augmented to give cache preference to data so marked in an obvious manner. In another embodiment, the Transaction Process identifies the resources needed by each step of the transaction automatically, and further identifies which resources will be needed multiple times, and at what point those resources may be released.

In another embodiment, the Transaction Process further optimizes processing by pre-allocating cache, storage space, locks, or other resources based on advance knowledge of one or more of the steps in the transaction. In another embodiment, the Transaction Process may alter the order of execution of the steps in such a manner such that the intended meaning of the transaction is not altered, but resource management and possibly performance is optimized, as for example, pre-reading all data in such a manner as to reduce disk I/O, to improve concurrency, or improve parallel processing. Other similar and numerous optimizations that become possible when one or more of the steps of a transaction are known in advance of the need to process those steps will be readily apparent to one familiar with the art.

In another embodiment, the definitions of a group of transactions necessary to process a particular application are stored in a repository. When a request is made to run the application, the Transaction Process looks up the definition of the transactions pertaining to said application, including all the steps in each transaction. The Transaction Process then determines the resources necessary to perform each step, determining at which step said resources must be first acquired, at which step they will last be used, and at which step they can be first released. (In an alternative embodiment, the repository also contains identification of all resources necessary to perform those steps, said resources having been previously identified either by software or human means. In yet another alternative embodiment, the repository also contains the relative time of said first acquisition, final use, and first possible release of each required resource.) The Transaction Process then applies any of numerous optimization methods well-known or accessible to one familiar with the art to optimize management of resources in its environment including, for example, data caching, lock management, concurrency, parallelism, and the like.

5 Dependency-based Concurrency Optimization

The method of dependency-based concurrency optimization enables a scheduling facility to restructure the steps or operations in a collection of one or more transactions so as to optimize concurrency and efficiency. By restructuring we mean changing either the order or the context of execution of transactions, steps, or groups of steps so as to be different from that order or context in which those transactions, steps, or groups of steps were submitted. The purpose of this method of "static scheduling" is to determine which transactions can absolutely be run together without interference, not which ones cannot. If there is doubt, traditional dynamic scheduling can be used. Dependency-based concurrency optimization is an improvement upon traditional transaction classes and traditional conflict graph analysis in that it provides a new means to determine dependencies and to respond to them using transaction restructuring. By augmenting the definition of a transaction (or group of transactions) with the dependencies among steps or groups of steps of said transaction and its consistency points, whether by human or computer means, the identification of which steps must be performed in which order can be determined using means well-known to those familiar with the art, including manual means. This information enables a computer system capable of parallel or concurrent processing to perform those steps or groups of steps which satisfy certain criteria to be performed in parallel or in an order different from the order in which they are submitted, and possibly at the discretion of an optimizer component. In particular, steps or groups of steps which can optionally be performed in parallel or in a different order are those that (1) have no mutual dependencies and (2) are not dependent on any other steps that have not yet been performed. Said dependencies information and said consistency point information may be supplied by any of a number of means. For example, each dependence between every pair of steps might be supplied as a simple instruction "(1,2), (1,3)", meaning that step 2 depends on step 1 and step 3 depends on step 1. Alternatively, the entire set of partially ordered dependencies might be supplied as a single data structure consisting of, for example, a linked list of trees with each tree specifying dependencies (a 'dependency tree'), the linked list simply being one possible means of collecting the dependency trees. Similarly, steps can be grouped together such that they have no dependencies with any steps not in the group and such that, if they begin execution on resources that are in a consistent state, then those resources are left in a consistent state when that group of steps complete, such a grouping being known as a 'consistent group'. A consistent group bounded by durable consistency points satisfies the formal definition of a transaction, albeit an implicit transaction. For example, if steps 1, 2, and 3 form such a group of steps bounded by consistency points and with the dependencies in the previous example, both dependency and consistency point information might be supplied via the instruction "<(1,2), (1,3)>". Numerous other means for supplying such information will be apparent to one familiar with the art, some means being optimally non-redundant, some optimal for human specification, some optimal for space, some optimal for processing time, and some optimal for yet other purposes. In said augmentation, each dependency can be specified in such a manner as to uniquely identify both transactions and the steps of those transactions. For example, each transaction might be given a unique transaction identifier and each step an identifier unique within that transaction. Then, a dependency specification such as "(A.1, A.2), (A.1, B.3)" can be given at any time after the referenced transaction steps are specified.

In the event that a transaction definition is not augmented with dependencies among the steps and among a group of transactions, dependencies can be determined automatically or semi-automatically via, for example, the following methods:

if two transaction steps or groups of steps do not touch the same resources, they are independent (although they may be transitively dependent);

if two transaction steps or groups of steps have same ultimate result irrespective of the order of application (that is, if they are commutative), they are independent;

if two transaction steps or groups of steps have no applicable consistency conditions in common, they are independent; or, if two transaction steps or groups of steps cannot both violate at least one consistency condition, thereby producing the same error, they are independent.

Transaction steps or consistent groups which execute within a single application instance and that are independent may be restructured. Consistent groups or transactions that are independent (that is, all of the steps in one consistent group or transaction are independent of all the steps in the other consistent group or transaction, respectively) may be restructured even if they run in separate application instances and with transaction isolation guaranteed by the system. As is well known, this fact enables the execution of such transactions without the overhead of locking (used to enforce isolation in pessimistic concurrency control) or the overhead of conflict detection mechanisms (used in optimistic concurrency control), thereby further optimizing the performance of transaction processing, so long as only mutually independent transactions are executed concurrently.

By extension, transactions that do not meet the mutual independence criteria may be simultaneously scheduled using some other method (the 'local method') to maintain concurrency and isolation (such as two-phase locking) provided that every collection of mutually independent transactions (or consistent groups) is isolated from each other and from all other transactions. Insofar as the 'local method' is concerned, each collection of mutually independent transactions (or consistent groups) is made to appear as a single transaction. For example, if two-phase locking is the local method, locks are maintained for each collection of mutually independent transactions (or consistent groups) as if they were a single transaction, and transactions (or consistent groups) within the collection read through all locks held by the collection but respect locks held by transactions outside the collection.

The method of dependency-based concurrency optimization may be extended with the concept of "conflict classes."

Transactions are divided into classes, and possibly belong to multiple classes. Each pair of classes is specified as being either dependent (potentially in conflict) or independent (impossible to ever be in conflict). If a transaction is not yet classified, it is evaluated to determine with which classes it potentially conflicts and with which it is independent. To belong to a class, the transaction must be potentially in conflict with every transaction in the said class. If the transaction matches the dependency and independency properties of the said class with respect to all other classes, it belongs to the said class; otherwise, it belongs to a different class. If no existing class meets these criteria, the transaction belongs to a new class. Transaction definitions are uniquely identified, and are recorded as belonging to a particular class based on that transaction identifier. Transactions are invoked by transaction identifier. Whenever a transaction request is received with such an identifier (or some means which permits association with such an identifier), the scheduler determines the classes to which the transaction belongs and from this information obtains the list of classes with which it is potentially in conflict (the dependent classes). It then checks to see if any running transaction belongs to one of the dependent classes. If such a transaction is running, the desired transaction is either deferred until that transaction completes, or another method of guaranteeing transaction isolation is used. If no such transaction is running, the desired transaction is executed.

Refinements of the technique are possible. In one embodiment, for example, the classifying of transactions is done at the transaction step level and it is then possible to schedule concurrent transaction steps from multiple transactions (as will be apparent to anyone familiar with the art). In this embodiment, each subsequent step of a transaction must be shown to be independent of all preceding and current steps of running transactions before it is permitted to run. In another embodiment, concurrent transactions proceed step by step until a possible conflict based on classes is detected, at which point one transaction is either deferred until the other transaction completes or else is rolled back to a consistency point (possibly the beginning of the transaction) and either resubmitted or a corrective transaction is submitted.

6 Combined Implementation (The Preferred Embodiment)

The preferred embodiment of the present invention in implemented in software (the 'Adaptive Transaction Manager') on a distributed network of computers with a distributed database management system implementing a business process involving multiple business entities. The business process consists of a large number of transactions, tasks, activities, and other units of work, many of them complex and some of them of an ad-hoc nature such that the entirety of their constituent steps or operations are not knowable in advance. The Adaptive Transaction Manger automatically identifies dependencies, consistency points, consistent groups, and redundant consistent groups. If a deadlock or other failure is encountered, the Adaptive Transaction Manager automatically recovers by rollback to a consistency point that eliminates the source of the error and then attempts to redo the work (it aborts only after retrying a pre-determined number of times or after a pre-determined amount of work). Redundant consistent groups are eliminated using transaction relaying, since two concurrent transactions having the same consistent group may share the work done by that group. A combination of transaction relaying, restructuring, and corrective transactions are used to eliminate most distributed transactions. When an error occurs, the error is classified according to whether it represents a transient, semantic, or hardware failure. If it is transient or hardware, transaction rollback to the most recent consistency point is invoked and the intervening work is resubmitted. This sequence is repeated for up to a fixed number of times and possibly with an intervening time delay (both determined by the type of error) until the transaction either succeeds or the number is surpassed. If the number of repetitions is surpassed, transaction rollback to an earlier consistency point is invoked and the work resubmitted. This process continues until the system recovers. If the error is semantic, the Adaptive Transaction Manager determines which prior consistency point will provide a starting point of an alternate path within the business process that best leads to an acceptable state, preferably with the least effort and best chance of successful completion. It then invokes one or more corrective transactions that together are functionally and semantically equivalent to that alternate path. The Adaptive Transaction Manager optimizes for efficiency through the use of lookahead resource management and dependency-based concurrency optimization, restructuring transactions and consistent groups where possible to minimize overhead (for example, due to locking).

The Adaptive Transaction Manager can rollback the system to a consistency point if there is an error that cannot be compensated for, if the cost of the compensation exceeds the value gained by the correction, or for other similar reasons. In a further enhancement of the preferred embodiment, the system record of the data and resources used in each transaction is used to hand off responsibility and control over the data and resources from one transaction to the next as each completes, that is, as each reaches a consistency point. Only those data and resources which are fully and correctly 'transitioned' are handed off, allowing auditable and non-interfering distribution or partial branching to occur without the hazard of contaminating data or processes, and without incurring the overhead of both multiple copies of data and tracking the current 'correct' subset. In this sense, a transaction that has reached a partial state which is correct for all other transactions for a subset of the data and resources it uses alone, can commit and release those data and resources rather than continue to tie them up needlessly.

Under the preferred embodiment of the present invention, the Adaptive Transaction Manager actively uses dependencies to detect which transaction needs to own what data and what resources at each particular step along a complex transaction, and minimizes duplication and locking of the same. Moreover, variable exploration of alternatives becomes feasible by implementing, in a further extension of the preferred embodiment, alternative methodologies for controlling such data and resources. For example, voting rules may be used (three processors to two), hierarchical rules (home office database overrules local branch), or heuristically derived rules peculiar to a particular business or operation.

In the preferred embodiment of the invention, whenever a compensating or corrective transaction is needed, a full audit trail of the original acceptable state, mistaken state, compensating or corrective transaction, and final acceptable state is maintained. In a further extension of the preferred embodiment the log of individual error audits is analyzed to identify recurring problems and suggest where additional preventative efforts be taken, including additional corrective transactions.

In the preferred embodiment, for each predetermined transaction the anticipated consistency category of the final state is registered with the Adaptive Transaction Manager, classes of errors are associated with corresponding classes of recovery methods (including compensating or corrective transactions), and the Adaptive Transaction Manager determines which compensating or corrective transactions to execute so that recovery to an acceptable state can take place automatically and consistently. Additionally, the Adaptive Transaction Manager maintains a log of 'acceptable' states as transactions are processed without uncompensated errors. The extent to which the Adaptive Transaction Manager allows transitions to become permanent depends now more on the level of accuracy which the business feels comfortable with than upon the static limitations of record-keeping.

Extensions to the preferred embodiment would make the system more applicable for particular business purposes including telecommunications rerouting; inventory management for retail or distributional operations that encounter spillage, wastage, or theft; electronic funds transfer message repair; financial transactions affected by governmental fiats; and billing systems reflecting or affected by collection processes, debtor failures, and bankruptcies.

In a further extension of the present invention this method is applied to a model for negotiations allowing exploration of hypothetical or proposed solutions, and their consequences and costs, to be evaluated.

In a further extension of the present invention this method is applied to asset exchanges where the parties do not have an initial agreement as to the value of the particular elements, or even agreement as to the particular elements that are the subject of the proposed exchange, beforehand, to allow intermediate positions to be evaluated and the costs and benefits of concessions and tradeoffs to be explicitly assessed.

However, the scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and may be necessary to the overall function of that particular claim, and should be read as including, to the maximum extent permissible by law, known functional equivalents to the elements disclosed in the specification, even though those functional equivalents are not exhaustively detailed herein.

I claim:

1. A computerized method for efficient transaction processing implemented as a defining feature of an Adaptive Transaction Manager ('ATM') and for implementing a consistent transaction state as a transaction consistency point, said method comprising:

(a) identifying a first set of consistency conditions among a first set of data elements as comprising at least a first consistency condition;

(b) identifying a second set of consistency conditions among a second set of data elements, not necessarily distinct from the first set of consistency conditions among the first set of data elements, as comprising at least a second consistency condition;

(c) associating the first set of consistency conditions with a first transaction having an initial state and an intended final state, said intended final state being:
  represented by the second set of data elements;
  required to satisfy the second set of consistency conditions; and,
  the first transaction's state at successful termination consistent with the second set of consistency conditions, as computed from the initial state and any parameters, and resulting from unexceptional execution;
(d) specifying a first transaction consistency point identified with a first consistent transaction state that is distinct from both the initial state and the intended final state of the first transaction;
(e) representing the first consistent transaction state of the first transaction at least partially by specific values of a subset of the first set of data elements;
(f) determining that the first consistent transaction state of the first transaction is consistent with the first set of consistency conditions;
(g) enabling the first transaction to be restored to the first consistent transaction state of the first transaction after the first transaction's state has progressed beyond the first consistent transaction state; and,
(h) recording a denotation of the first consistent transaction state of the first transaction, said denotation being differentiated from any denotation of any transaction state that is not consistent with any identified set of consistency conditions, and from any denotation of any transaction state that is merely any of a synchronization point, a synch point, a savepoint, and a checkpoint.

2. A method as in claim 1, wherein the step of determining further comprises:
  accepting an assertion that the first consistent transaction state of the first transaction is consistent with the first set of consistency conditions as valid.

3. A method as in claim 2, wherein the assertion that the first consistent transaction state is consistent with the first set of consistency conditions is made by a human user.

4. A method as in claim 2, wherein the step of determining further comprises:
  establishing that consistency by confirming the assertion's validity through at least one computable test.

5. A method as in claim 4, wherein the step of determining is accomplished without human involvement.

6. A method as in claim 1, wherein the step of recording is at least partially implemented by a human user.

7. A method as in claim 1, further comprising:
  recording a representation of the first transaction consistency point, the representation being differentiable from that for any other transaction consistency point.

8. A method as in claim 1, further comprising:
  detecting a first undesirable condition at a second transaction state of the first transaction;
  selecting the first transaction consistency point; and,
  recovering from the first undesirable condition, further comprising;
    using the recorded denotation of the first consistent transaction state to transition the first transaction's state to the first transaction consistency point.

9. A method as in claim 8 wherein the first undesirable condition is a deadlock, further comprising:
  automatically recovering from the first undesirable condition without selecting any transaction involved in the deadlock as the transaction to be affected.

10. A method as in claim 1, wherein the step of specifying further comprises:
  automatically detecting the first consistent transaction state; and,
  automatically implementing a first savepoint at the first transaction consistency point without any human supplied instruction asserting the first savepoint.

11. A method as in claim 1, further comprising:
  associating a first identifier with the first transaction consistency point distinct from any identifier of any other transaction consistency point of the first transaction.

12. A method as in claim 11, further comprising:
  determining the first identifier automatically and in accordance with a predefined naming convention.

13. A method as in claim 11, further comprising:
  determining the first identifier in accordance with at least a first signal originating from a human user.

14. A method as in claim 1, further comprising:
  making the first consistent transaction state restorable after any catastrophic failure by making the first transaction consistency point durable.

15. A method as in claim 1, further comprising:
  identifying a first intermediate transaction state of the first transaction;
  determining that the first intermediate transaction state does not satisfy the required properties of any transaction consistency point and that the first intermediate transaction state is at least one of a synchronization point, a synch point, a checkpoint, and a savepoint;
  determining that the first consistent transaction state is not any of a synchronization point, a synch point, a checkpoint, and a savepoint except insofar as the first consistent transaction state is also a durable transaction consistency point; and,
  identifying any of a synchronization point, a synch point, a checkpoint, and a savepoint explicitly with a set of consistency conditions pertaining to a corresponding transaction state only if the corresponding transaction state is also some transaction consistency point.

16. A method as in claim 1, further comprising:
  specifying a first detectable condition;
  creating a first association between the first detectable condition and the first transaction consistency point;
  detecting the first detectable condition; and,
  selectively transitioning the first transaction to the first transaction consistency point responsive to detection of said first detectable condition and as a logical consequence of the first association.

17. A method as in claim 1, further comprising:
  creating a first transaction consistency point category;
  defining the first transaction consistency point category at least partially according to a set of category consistency conditions that any transaction consistency point must satisfy in order to be a member of the first transaction consistency point category;
  denoting the first transaction consistency point category uniquely by an identifier; and,
  determining that at least one transaction consistency point belongs to the first transaction consistency point category.

18. A method as in claim 17, further comprising:
  establishing a first error class comprising at least a first type of error;
  establishing the first transaction consistency point category; and, associating the first error class with the first transaction consistency point category.

19. A method as in claim 18, further comprising:
determining that a first error has occurred;
determining that the first error is of the first type of error and consequently a member of the first error class;
determining that the first error class is associated with the first transaction consistency point category;
determining that a second transaction consistency point of a second transaction is a member of the first transaction consistency point category; and,
transitioning the second transaction's state to the second transaction consistency point.

20. A method as in claim 1, implementing a defining feature of transaction relaying, further comprising:
identifying a first resource set comprising at least a first resource;
determining that both a first resource-using transaction and a second resource-using transaction depend on the first resource set;
determining that the first resource-using transaction is at a second transaction consistency point;
determining that the first resource set's state is consistent at the second transaction consistency point;
establishing control over the first resource set by the first resource-using transaction such that any predefined isolation level for that first resource-using transaction is maintained; and,
transferring, while the first resource-using transaction's state and the first resource set's state are at the second transaction consistency point, control over and accessibility to the first resource set and at least one data element of the first resource set's state from the first resource-using transaction to the second resource-using transaction, prior to committing either the first resource-using transaction or the second resource-using transaction.

21. A method as in claim 20, wherein the step of transferring further comprising:
disabling modification of at least a first portion of the first resource set by the first resource-using transaction; and,
enabling modification of at least the first portion of the first resource set by the second resource-using transaction.

22. A method as in claim 20, wherein the step of transferring further comprises:
transferring control over the first resource, associated with a first priority, from the first resource-using transaction to the second resource-using transaction, further comprising:
removing the first priority from the first resource-using transaction; and,
assigning the first priority to the second resource-using transaction.

23. A method as in claim 20, further comprising:
identifying a first transaction group comprising at least the first resource-using transaction;
identifying a second transaction group comprising at least the second resource-using transaction; and,
transferring, while the first resource set's state is at some transaction consistency point, control over and accessibility to the first resource set and at least one element of its state from the first transaction group to the second transaction group, prior to committing any of the first transaction group and the second transaction group.

24. A method as in claim 20, further comprising:
identifying a third transaction group comprising a plurality of transactions each of which depend on the first resource set;
determining that the first resource-using transaction and the second resource-using transaction belong to the third transaction group; and,
maintaining a two phase protocol with respect to controlling access to elements of the first resource set so that the third transaction group behaves as a single transaction with respect to controlling access to any member of the first resource set, and without the need to differentiate which transaction in the third transaction group requests any type of access control, incorporating the ordered substeps of:
acquiring all required access control over data elements of the first resource set exclusively during an acquisition phase; and,
releasing all previously acquired access control over data elements of the first resource set exclusively during a release phase, said release phase being subsequent to the completion of said acquisition phase;
implementing only one acquisition phase; and,
implementing only one release phase.

25. A method as in claim 20, further comprising:
identifying a third transaction group comprising a plurality of transactions each of which depend on the first resource set;
determining that the first resource-using transaction and the second resource-using transaction belong to the third transaction group; and,
selecting an operation from among:
escalation in which the scope of access control is increased so as to be over additional resources;
de-escalation in which the scope of access control is decreased so as to be over fewer resources
executing the operation across the third transaction group as if the third transaction group consisted of a single transaction scope.

26. A method as in claim 20, further comprising:
identifying a third transaction group comprising a plurality of transactions each of which depend on the first resource set;
determining that the first resource-using transaction and the second resource-using transaction belong to the third transaction group;
selecting an operation from among:
promotion in which the number of types of operations permitted by access control on a first controlled resource belonging to the first resource set is increased; and,
demotion in which the number of types of operations permitted by access control on the first controlled resource belonging to the first resource set is decreased; and,
executing the operation across the third transaction group as if it consisted of a single transaction scope.

27. A method as in claim 20, further comprising:
determining that both the first resource-using transaction's definition and the second resource-using transaction's definition incorporate at least a first redundant instruction specifying an operation on at least the first resource in the first resource set;
removing the first redundant instruction from at least one of the first resource-using transaction's definition and the second resource-using transaction's definition; and, executing the first redundant instruction only once when the first resource-using transaction and the second resource-using transaction have overlapping executed.

28. A method as in claim 20, further comprising:
determining that the first resource-using transaction's definition incorporates at least a first movable instruction;
determining that the first movable instruction modifies only elements of the first resource set;
removing the first movable instruction from the first resource-using transaction's definition so that the first movable instruction is not executed as part of the execution of the first resource-using transaction; and,
inserting the first movable instruction in the second resource-using transaction's definition so that the first movable instruction is executed as part of the execution of the second resource-using transaction.

29. A method as in claim 20, the step of transferring incorporates a publication/subscription sub-method, said sub-method further comprising:
determining that the first transaction and the first resource set are consistent with a second consistent transaction state comprising one of the first transaction consistency point, the first transaction's initial state, or the first transaction's final state;
selecting a first publication so as to at least partially convey information about the first transaction while the first transaction's state is in the second consistent transaction state and selected from among at least one member of a set comprising consistency conditions, data, events, messages, and the first resource set's state;
determining a referent to the first publication;
maintaining a relationship between the first publication's referent and at least a first subscribing entry that can be associated with at least a first subscriber;
publishing the first publication at the second consistent transaction state by making the first publication selectively available outside the first transaction's scope via the first publication's referent; and,
making the first publication accessible to the first subscriber via the first publication's referent prior to the first transaction doing any of commit, abort, and rollback.

30. A method as in claim 29, further comprising:
determining that the first transaction and the first resource set are consistent with a second consistent transaction state comprising one of the first transaction consistency point, the first transaction's initial state, and the first transaction's intended final state;
selecting a first constraint satisfied by the second consistent transaction state;
selecting a first constraint denotation of the first constraint;
selecting the second consistent transaction state denotation that conveys identification of the second consistent transaction state;
making the second consistent transaction state denotation accessible outside the first transaction's scope;
making the first constraint denotation of the first constraint available to a first entity outside the first transaction's scope;
using the first constraint denotation to make the first constraint available to the first entity; and,
enabling the first entity non-exclusive access to the first constraint by reference to the first constraint denotation.

31. A method as in claim 29, further comprising:
enabling a second subscribing entity to have access to the first publication; and,
selectively permitting at least one of the first subscribing entity and the second subscribing entity to modify the first resource set.

32. A method as in claim 20, further comprising:
using a locking flag to denote a dependency on a second resource in the first resource set by the first resource-using transaction.

33. A method as in claim 32, further comprising:
transferring the control and responsibility over the locking flag to the second resource-using transaction when the second resource-using transaction has not yet attained a consistent state with respect to the second resource and when the first transaction's state is consistent with respect to the second resource.

34. A method as in claim 20, implementing a defining feature of transaction relaying, wherein the first resource-using transaction belongs to a first resource-using transaction group, and the second resource-using transaction belongs to a second resource-using transaction group, further comprising:
identifying a first resource-using transaction group comprising at least the first resource-using transaction;
identifying a second resource-using transaction group comprising at least the second resource-using transaction;
determining that both the first resource-using transaction group and the second resource-using transaction group depend on the first resource set;
determining that the first resource-using transaction group is at the second transaction consistency point;
determining that the first resource set's state is consistent at the second transaction consistency point;
establishing control over the first resource set by the first resource-using transaction group such that any pre-defined isolation level for that first resource-using transaction is maintained; and,
transferring, while the first resource-using transaction group's state and the first resource set's state are at the second transaction consistency point, control over and accessibility to the first resource set and at least one element of the first resource set's state from the first resource-using transaction group to the second resource-using transaction group, prior to committing the first resource-using transaction group and prior to committing the second resource-using transaction group.

35. A method as in claim 1, further comprising:
using the first transaction consistency point to optimize at least one aspect of commit processing from a set of commit processing optimizables including resource consumption, performance, and concurrency;
selecting a first commit processing operation from a set of commit processing operations comprising writing to a transaction log, releasing resources, checkpointing, synchronizing volatile storage with non-volatile storage, and checking consistency conditions;
performing at least a portion of the first commit processing operation after the first transaction consistency point and before initiation of a subsequent transaction step, wherein the subsequent transaction step is neither commit nor rollback; and,
initiating the subsequent transaction step.

36. A method as in claim 1, implementing acceptable states, further comprising:

identifying the second set of consistency conditions that the first transaction's final state is initially intended to satisfy;

identifying an alternative set of consistency conditions, different from the primary set of consistency conditions, that constrains a first acceptable state, the first acceptable state being a second transaction consistency point;

enabling the first transaction to reach the first acceptable state as a final state; and, committing the first transaction.

37. A method as in claim 1, implementing a defining feature of corrective transactions, further comprising:

identifying at least the first transaction by the set of consistency conditions to be enforced on a first resource set comprising at least a first resource;

detecting a first exceptional condition during execution of the first transaction;

restoring the first transaction to a previous transaction state that is the first consistent transaction state, and without ending the transaction context;

selecting a corrective transaction distinct from the first transaction; and, executing the corrective transaction within the context of the first transaction and thereby transitioning the first transaction to a second transaction consistency point distinct from any previous state of the first transaction other than the first transaction's intended final state, said second transaction consistency point.

38. A method as in claim 37, further comprising:

recording the corrective transaction's steps;

recording the first transaction's steps;

recording the first exceptional condition;

analyzing the relationship among the corrective transaction's steps, the first transaction's steps, and the first exceptional condition resulting in a first analysis; and determining a subsequent corrective transaction's steps at least partially based on the first analysis.

39. A method as in claim 37, wherein the step of selecting a corrective transaction further comprises, before the step of executing a corrective transaction:

constructing at least a portion of the corrective transaction from a set of partially-ordered interdependent elements wherein each element's type is one of transaction, transaction group, group of transaction steps, consistent group, process, activity, task, and transaction step.

40. A method as in claim 37, wherein the step of selecting a corrective transaction further comprises, before executing the corrective transaction:

selecting the corrective transaction to be executed according to the set of consistency conditions the corrective transaction's final state is required to satisfy.

41. A method as in claim 37, wherein the step of selecting a corrective transaction further comprises, before executing the corrective transaction:

selecting the corrective transaction from among a plurality of corrective transactions.

42. A method as in claim 41, wherein the step of selecting a corrective transaction further comprises:

identifying acceptable sets comprising as members at least both of:

(a) a first acceptable set of consistency conditions that the first transaction's end state is expected to satisfy after the effect of some corrective transaction incorporated and executed within the first transaction's context; and, (b) the set of consistency conditions that the first transaction's end state is expected to satisfy without any effect due to any corrective transaction incorporated and executed within the first transaction's context;

wherein the first transaction's end state is required to satisfy at least one member of the acceptable sets;

identifying a desired acceptable state satisfying a target set of acceptable conditions which is a member of the acceptable sets;

selecting the corrective transaction so that the corrective transaction's end state is consistent with a goal of transitioning the first transaction's state to the desired acceptable state; and, enabling the first transaction to reach the desired acceptable state by invoking the corrective transaction.

43. A method as in claim 42, wherein the step of selecting a corrective transaction further comprises:

incorporating a theorem prover to automatically and at least partially determine via construction of a proof at least one of:

(a) a target set of acceptable conditions which the first transaction's end state must satisfy on completion; and, (b) those steps which constitute the corrective transaction by reasoning from the first transaction consistency point as the corrective transaction's initial state wherein the corrective transaction's initial state is treated as a set of axioms, to some transaction state which meets the target set of acceptable conditions and which becomes the corrective transaction's final state, the proofs steps being incorporated as the corrective transaction's steps.

44. A method as in claim 42, wherein the step of selecting a corrective transaction further comprises:

identifying a target set of acceptable conditions which the first transaction's end state must satisfy at commit;

incorporating rule-based inference, further comprising:

identifying a first rule the antecedent of which is predicated on the error class;

identifying a second rule the consequence of which includes the target set of acceptable conditions;

inferring, from at least one of the first rule and the second rule, the target set of acceptable conditions that the corrective transaction must satisfy upon completion.

45. A method as in claim 42, wherein the step of selecting a corrective transaction (as in claim 41) further comprises:

selecting a desired acceptable state from among those transaction states that satisfy the target set of acceptable conditions;

identifying the first transaction's current state;

implementing pre-set business policies via policy-driven programming in deriving the corrective transaction from the difference between the desired acceptable state and the first transaction's current state; and, automatically invoking the corrective transaction to transition the first transaction's current state to the desired acceptable state during execution of the corrective transaction.

46. A method as in claim 42, wherein the step of executing a corrective transaction is selectively not done when the anticipated cost-benefit of an alternative response justifies using the alternative response over using the corrective transaction, further comprising:

identifying the first transaction's current state;

evaluating a first cost-benefit, said first cost-benefit being that of executing a first corrective transaction;

evaluating a second cost-benefit, said second cost-benefit being that of executing an alternative response, and said alternative response being distinct from the first corrective transaction;

comparing the first cost-benefit and the second cost-benefit, resulting in a first comparison;
selecting a first response from among the first corrective transaction and the alternative response based on the first comparison; and,
executing the first response instead of executing the corrective transaction.

47. A method as in claim 42, wherein the step of selecting a corrective transaction further comprises:
selecting a desired acceptable state from among those transaction states that satisfy the target set of acceptable conditions;
identifying the first transaction's current state;
deriving said corrective transaction via goal-oriented programming applied to the difference between the desired acceptable state and the first transaction's current state; and,
during execution, applying the corrective transaction to the first transaction's state so that the first transaction transitions to the desired acceptable state.

48. A method as in claim 42, wherein the step of selecting a corrective transaction further comprises:
identifying the transaction's current state;
deriving said corrective transaction via genetic algorithms applied to the difference between the desired acceptable state and the first transaction's current state; and,
during execution, applying the corrective transaction to the first transaction's current state so that the first transaction's state will transition to the desired acceptable state.

49. A method as in claim 42, wherein the step of selecting a corrective transaction further comprises:
identifying the transaction's current state;
deriving said corrective transaction via back propagation applied to the difference between the desired acceptable state and the first transaction's current state; and,
during execution, applying the corrective transaction to the first transaction's current state so that the first transaction transitions to the desired acceptable state.

50. A method as in claim 42, wherein the step of selecting a corrective transaction further comprises:
identifying the transaction's current state;
incorporating algebraic algorithms to calculate the least-cost, highest-benefit corrective transaction that will transition the first transaction's state to the desired acceptable state.

51. A method as in claim 42, wherein the step of selecting a corrective transaction further comprises:
selecting a desired acceptable state from among those transaction states that satisfy the target set of acceptable conditions;
identifying the first transaction's current state;
incorporating using single-element redefinition algorithms to calculate the least-cost, highest-benefit corrective transaction that will transition the current transaction state to reach the desired acceptable state.

52. A method as in claim 42, wherein the step of selecting a corrective transaction further comprises:
selecting a minimally-acceptable set of consistency conditions as the target acceptable set;
identifying the first transaction's current state;
incorporating any of a theorem prover, genetic algorithms, back propagation, rule based inference, goal-oriented programming, policy-driven programming, back-chaining, optimization, user preferences, human interaction, cost-benefit analysis, and algebraic algorithms to do any of:
(a) determining the corrective transaction to be applied to the first transaction's current state based on a best fit approach to satisfying the minimally-acceptable set of conditions; and,
(b) determining the corrective transaction to be applied to the first transaction's current state further comprising:
determining the corrective transaction so that the corrective transaction's end state most closely matches a minimally-acceptable consistent state that satisfies the acceptable conditions;
performing the step of executing the corrective transaction;
reporting the remaining difference between the corrective transaction's final state and the minimally-acceptable consistent state; and,
accepting and executing an instruction group comprising at least a first instruction, so that the instruction group transitions the first transaction's state from the corrective transaction's final state to the minimally acceptable consistent state.

53. A method as in claim 41, wherein the step of selecting a corrective transaction incorporates optimization criteria, further comprising:
identifying a set of optimization criteria comprising at least a first optimization criterion;
identifying a first corrective transaction and a second corrective transaction;
determining that first corrective transaction satisfies the set of optimization criteria better than the second corrective transaction; and,
selecting the first corrective transaction as the corrective transaction to be executed.

54. A method as in claim 53, wherein the set of optimization criteria incorporates at least a first user preferences by which the step of selecting a corrective transaction is influenced.

55. A method as in claim 41, wherein the step of selecting a corrective transaction further comprises:
identifying that transaction consistency point that will be the corrective transaction's initial state;
identifying a target set of acceptable conditions which the first transaction's end state must satisfy at commit;
incorporating back-chaining, further comprising:
starting from a desired transaction state that satisfies a target set of acceptable conditions and is therefore a desired transaction consistency point;
selectively incorporating a plurality of corrective transaction steps from a pool comprising any of transaction steps, processes, activities, human interactions, operations, and transactions until the desired transaction consistency point is reached; and,
constructing the corrective transaction from the incorporated steps in the reverse order of incorporation such that the desired transaction consistency point is logically inferable from the corrective transaction's initial state and the transaction steps that have been incorporated in the corrective transaction.

56. A method as in claim 41, wherein the step of selecting a corrective transaction further incorporates human interaction.

57. A method as in claim 41, wherein the step of selecting a corrective transaction further comprises:
selecting an optimization goal;
selecting a first component of the corrective transaction from a component set comprising any of acceptable conditions, acceptable state, corrective transaction steps, and ordering of the corrective transaction's steps; and, optimizing the first component of the corrective transaction so as to better achieve the optimization goal.

58. A method as in claim 37, further comprising:

establishing at least a first class of exceptional conditions comprising at least the first exceptional condition;

establishing at least a first consistency category comprising at least the second set of consistency conditions;

associating the first class of exceptional conditions with the first consistency category; and, requiring that the first transaction consistency point satisfy at least one set of consistency conditions of those sets that are members of the first consistency category associated with the first class of exceptional conditions.

59. A method as in claim 58, wherein the first transaction is a portion of a business process, further comprising, before the step of executing a corrective transaction:

determining that the second set of consistency conditions is a member of the first consistency category;

identifying that transaction consistency point which satisfies the second set of consistency conditions and which would have been the first transaction's final state had the first exceptional condition not occurred; and, selecting the corrective transaction so as to transition the first transaction's state from the first transaction consistency point to a third transaction consistency point; and, determining that the third transaction consistency point also satisfies some set of consistency conditions which is a member of the first consistency category.

60. A method as in claim 59, further comprising:

constructing the corrective transaction from a set of partially-ordered and interdependent steps in a specification of the business process.

61. A method as in claim 59, wherein the corrective transaction uses an alternative resource set distinct from the first resource set used by the first transaction and comprises at least a second resource.

62. A method as in claim 59, further comprising, before executing a corrective transaction and on detection of an exceptional condition wherein said exceptional condition is classified:

identifying a first class of exceptional conditions of which the exceptional condition is a member;

accessing a third consistency category associated with the first class of the exceptional condition;

restoring the first transaction to a first transaction consistency point satisfying some set of consistency conditions belonging to the third consistency category;

looking up a fourth consistency category associated with that transaction consistency point which is the first transaction's intended final state;

identifying the corrective transaction so that the corrective transaction's end state satisfies some set of consistency conditions belonging to the fourth consistency category; and, selecting the corrective transaction for execution.

63. A method as in claim 62, further comprising:

determining a minimally acceptable set of consistency conditions;

determining a first alternative end state resulting from a first corrective transaction, said first alternative end state satisfying the acceptable conditions;

determining a second alternative end state resulting from a second corrective transaction, said second alternative end state satisfying the acceptable conditions;

selecting that corrective transaction from among the first corrective transaction and the second corrective transaction, said applicable corrective transaction's alternative end state being preferred in relation to the minimally acceptable consistent state; and, executing that corrective transaction.

64. A method as in claim 63, further comprising:

conveying both the minimally acceptable consistent state and the corrective transaction's end state in human readable form;

accepting a signal from a human user defining a first manual step; and, executing the first manual step within the corrective transaction's transaction context.

65. A method as in claim 59, further comprising:

creating a first class of exceptional conditions, comprising at least the first exceptional condition;

creating a second consistency category comprising at least a fourth set of consistency conditions;

creating a denotation of an association between the first exceptional condition class and the second consistency category; and, storing said denotation.

66. A method as in claim 59, further comprising:

creating a first transaction class;

associating the first transaction and the first transaction class.

67. A method as in claim 59, further comprising:

defining a first group of transaction steps comprising steps selected from the first transaction;

defining a fifth set of consistency conditions comprising at least a fifth consistency condition;

determining that, after successful execution of the first group of transaction steps, the first group of transaction steps' end state satisfies the fifth set of consistency conditions; and, associating the first group of transaction steps with the fifth set of consistency conditions.

68. A method as in claim 1, wherein the first set of consistency conditions, satisfied by the first transaction consistency point are distinct from the second set of consistency conditions satisfied when the first transaction commits.

69. A method as in claim 1, implementing a defining feature of lookahead based resource management, further comprising:

identifying a first resource on which the first transaction depends;

determining that the first resource should be given a degree of resource favoring during subsequent processing of the first transaction;

determining a step in the first transaction at which the degree of resource favoring should be altered;

specifying how the degree of resource favoring should be altered from among increasing and decreasing;

storing at least a first directive comprising denotations of the first resource to be affected by resource favoring, the first transaction, the transaction step; and how the degree of resource favoring should be altered; and, responding to the first directive when the first transaction reaches the transaction step comprising altering the degree of resource favoring according to how the degree of resource favoring should be altered.

70. A method as in claim 69, further comprising:
incorporating a denotation of the first directive within a transaction definition.

71. A method as in claim 69, further comprising:
automatically identifying a step that will produce the first transaction consistency point and incorporating a designation of the first transaction consistency point within the transaction definition.

72. A method as in claim 69, further comprising:
a submethod of optimizing transaction processing comprising:
   determining that a transaction step depends on a first data resource; and,
   pre-allocating the first data resource at some transaction consistency point prior to executing the step.

73. A method as in claim 69, further comprising:
a submethod of optimizing transaction processing comprising:
   determining that the first transaction comprises a first resource-dependent step that depends on a first data resource;
   pre-fetching at least a portion of the first data resource at some transaction consistency point of the first transaction prior to executing the first resource-dependent step; and,
   caching the portion of the first data resource until the first resource-dependent step is executed.

74. A method as in claim 69, further comprising:
a submethod of optimizing transaction processing comprising the steps of:
   identifying a first transaction step in the first transaction;
   identifying a second transaction step in the first transaction;
   determining that the first transaction is defined so as to execute the first transaction step prior to executing the second transaction step;
   determining that executing the second transaction step prior to executing the first transaction step is an acceptable order of execution consistent with the first transaction's definition;
   determining that executing the second transaction step prior to executing the first transaction step will optimize the first transaction; and,
   rewriting the first transaction's definition so as to describe executing the second transaction step prior to executing the first transaction step.

75. A method as in claim 69, further comprising:
a submethod of optimizing transaction processing comprising the steps of:
   storing a reference to a first software application;
   determining that the first software application depends on the first transaction;
   storing the first transaction's definition;
   storing an association between the first transaction and the first software application;
   retrieving, via the association between the first transaction and the first software application, the first transaction's definition after the first software application is invoked; and,
   enabling execution of the first transaction when and as required by the first software application.

76. A method as in claim 69, further comprising:
a submethod of optimizing transaction processing comprising the steps of:
   storing a reference to the first transaction;
   determining that a first transaction step in the first transaction depends on the first resource;
   storing a reference to the first resource;
   storing an association between the first transaction and the first resource;
   retrieving, via the association between the first transaction and the first resource, the first transaction's definition in preparation for the first transaction to be invoked; and,
   enabling access to the first resource when and as required by the first transaction.

77. A method as in claim 69, further comprising:
a submethod of optimizing transaction processing comprising the steps of:
   determining that the first transaction depends on both the first resource and a second resource;
   storing a first temporal property description of a first time-related property, said first time-related property being associated with at least one of the first resource, the second resource, and a relationship among the first resource and the second resource; and,
   using the first temporal property description to control the use of at least one of the first resource and the second resource.

78. A method as in claim 1 implementing a defining feature of dependency-based concurrency optimization for efficient transaction processing, comprising:
   implementing a consistent group as a first grouping of transaction steps, further comprising the steps of:
      determining that the first transaction comprises both a first transaction step and a second transaction step;
      determining whether any dependencies exist among the first transaction step and the second transaction step;
      identifying the first transaction step grouping comprising at least the first transaction step,
      implementing the first grouping of transaction steps so that every transaction step executed within the first grouping of transaction steps except the first transaction step is dependent on at least one other transaction step within the first grouping of transaction steps;
      implementing the first grouping of transaction steps so that no transaction step within the first grouping of transaction steps is dependent on any transaction step not within the first grouping of transaction steps; and,
      implementing the first grouping of transaction steps so that both the first grouping of transaction steps' initial state and the first grouping of transaction steps' final state are transaction consistency points.

79. A method as in claim 78, further comprising:
storing and maintaining a plurality of dependencies in a representation of a dependency tree.

80. A method as in claim 78, further comprising:
determining that a third group of transaction steps comprising at least one transaction step in a third transaction and that a fourth group of transaction steps comprising at least one transaction step in a fourth transaction are neither order interdependent, semantically interdependent, nor resource interdependent, the third group of transaction steps and fourth group of transaction steps are not necessarily in distinct transactions;
determining that the third group of transaction steps and the fourth group of transaction steps are not currently specified so as to be executed using some form of overlapping processing; and, scheduling the third group of transaction steps and the fourth group of transaction steps to be executed using some form of overlapping processing, said form including but not limited to concurrent processing, distributed processing, parallel processing, and asynchronous processing.

81. A method as in claim 80, further comprising:
implementing a concurrency control method;
selectively not using the concurrency control method to enforce transaction isolation among the third consistent group and the fourth consistent group when executing the third consistent group and the fourth consistent group.

82. A method as in claim 81, wherein the type of concurrency control method is one of pessimistic concurrency control, optimistic concurrency control, and versioning.

83. A method as in claim 81, further comprising:
selectively and automatically disabling conflict detection, said conflict detection designed to prevent conflicting access by a plurality of transactions to a plurality of resources, among the third group of transaction steps and the fourth group of transaction steps when executing the third group of transaction steps and the fourth group of transaction steps.

84. A method as in claim 78, further comprising:
defining a plurality of conflict classes, each conflict class comprising a plurality of members that are potentially in mutual conflict when concurrently executing and each member selected from among a consistent group, a transaction, process, activity, task, and a transaction step;
determining that a first member belongs to at least a first conflict class;
determining that the first member is ready to be scheduled for execution; and,
scheduling the first member for execution only when no other member of any conflict class to which the first member belongs is also scheduled for concurrent execution.

85. A method as in claim 78, wherein the transaction consistency point is durable.

86. A method as in claim 78, further comprising:
identifying a first consistent group and a second consistent group;
determining an optimized execution order, said optimized execution order specifying the execution order among the first consistent group and the second consistent group and being determined independently of any order specified in any transaction definition and independently of any requested order of execution except by default; and,
executing the first consistent group and the second consistent group in said optimized execution order.

87. A method as in claim 1, implementing a defining feature of dependency-based concurrency optimization, further comprising:
a submethod of optimizing transaction processing comprising the steps of:
storing a reference to the first transaction;
storing the first transaction's definition containing instructions for a plurality of transaction steps;
determining that a second transaction step in the first transaction depends on a third transaction step;
storing a first reference to the first transaction resource; and,
augmenting the definition of the first transaction with at least one explicit statement describing at least one dependency among the second transaction step and the third transaction step.

88. A method as in claim 1, implementing a defining feature of dependency-based concurrency optimization, further comprising:
a submethod of optimizing transaction processing comprising the steps of:
storing a first reference to the first transaction;
storing a second reference to a second transaction;
storing the first transaction's definition containing instructions for a plurality of transaction steps;
storing the second transaction's definition containing instructions for a plurality of transaction steps;
creating a transaction group comprising the first transaction and the second transaction;
determining that the first transaction depends on a second transaction;
storing a third reference to the transaction group; and,
augmenting at least one of the transaction group, the third transaction group's definition, the first reference, the second reference third reference, the first transaction's definition, and the second transaction's definition with at least one explicit statement describing at least one dependency among the first transaction and the second transaction.

89. A method as in claim 1, implementing a defining feature of lookahead based resource management, further comprising:
identifying the first resource;
selectively re-allocating the first resource at the first transaction consistency point.

* * * * *